(12) United States Patent
Fukuda et al.

(10) Patent No.: US 6,434,275 B1
(45) Date of Patent: Aug. 13, 2002

(54) BLOCK DISTORTION REDUCTION METHOD AND DEVICE AND ENCODING METHOD AND DEVICE

(75) Inventors: Kyoko Fukuda; Hiroshi Kobayashi; Nobuhiro Igi, all of Kanagawa; Koji Obata, Tokyo; Motoki Kato, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/230,465

(22) PCT Filed: May 28, 1998

(86) PCT No.: PCT/JP98/02370

§ 371 (c)(1),
(2), (4) Date: Jun. 7, 1999

(87) PCT Pub. No.: WO98/54892

PCT Pub. Date: Dec. 3, 1998

(30) Foreign Application Priority Data

May 28, 1997 (JP) ............................................... 9-138921
Jan. 27, 1998 (JP) .......................................... 10-014443

(51) Int. Cl.$^7$ ................................................. G06K 9/36
(52) U.S. Cl. ...................................... 382/275; 382/268
(58) Field of Search ........................ 382/275, 260–269, 382/268, 232, 236; 358/432–433

(56) References Cited

U.S. PATENT DOCUMENTS 5,557,330 A * 9/1996 Astle .......................... 348/394
5,610,729 A * 3/1997 Nakajima ................... 358/463
5,949,917 A * 9/1999 Kawasaka ................... 382/268
6,360,015 B1 * 3/2002 Bakhmutsky et al. .. 375/240.17

FOREIGN PATENT DOCUMENTS

| JP | 4-342372 | 11/1992 |
| JP | 5-308623 | 11/1993 |
| JP | 8-237658 | 9/1996 |

* cited by examiner

Primary Examiner—Thomas D. Lee
Assistant Examiner—Stephen Brinich
(74) Attorney, Agent, or Firm—Frommer Lawrence & Haug LLP; William S. Frommer; Samuel H. Megerditchian

(57) ABSTRACT

An apparatus incorporates encoding-degree-of-difficulty detecting means 3 for detecting a parameter indicating an encoding degree of difficulty from supplied image data; parameter calculating means 4 for calculating a parameter required to determine block distortion from supplied image data; block distortion determining means 6 for determining block distortion in accordance with a result of detection of the parameter indicating the encoding degree of difficulty and a result of the calculation for obtaining the parameter; correction-value calculating means 7 for calculating a correction value for reducing block distortion; and means for subjecting supplied image data to a correction using a correction value corresponding to a result of the determination of block distortion so as to produce an output.

29 Claims, 25 Drawing Sheets

BLOCK DISTORTION REDUCTION METHOD AND DEVICE AND ENCODING METHOD AND DEVICE

TECHNICAL FIELD

The present invention relates to a method and an apparatus for reducing block distortion occurring in block encoding with which input data, such as still image data or moving image data, is formed into blocks so as to be subjected to a DCT encoding process and to a method and an apparatus for encoding data while the block distortion is reduced.

BACKGROUND ART

Hitherto, as an encoding method for efficiently compressing and encoding still image data, moving image data or the like, a block encoding method, such as block DCT (Discrete Cosine Transformation) method, has been known.

When image data or the like is compressed/expanded by the block encoding method, block distortion (block noise) sometimes occurs. In proportion to the compression ratio, distortion easily occurs. Since the DCT encoding process is arranged to perform transformation in a closed space in a block and no consideration is made about correlation across the block boundary, continuity across the block boundary cannot be maintained. Thus, deviation of the value of reproduced data occurring in a boundary region from an adjacent block is perceptible as noise. Since block distortion occurring when image data is block-encoded has a certain type of regularity, the foregoing block distortion is more perceptible as compared with usual random noise. Therefore, the foregoing distortion considerably deteriorate the image quality.

To reduce block distortion, document "NOISE ELIMINATING FILTER ON THE BASIS OF MC-DCT CODING METHOD", Ida and Datake, 7–35, theses for lectures in Spring National Meeting of Electronic Information Society, 1990, has disclosed a technique in which edges which are original information of an image is preserved. Moreover, noise of the edges are eliminated by using quantized steps to determine whether the filter is turned on or off. Moreover, the processing direction is changed to perform a plurality of processes. Moreover, document "CHARACTERISTICS OF ADAPTIVE NOISE ELIMINATING FILTER IN BLOCK-ENCODING OF IMAGE", Izawa, Vol. 74, pp. 89–100, transactions of Department of Engineering, Shinshu University, has disclosed a technique in which also peripheral blocks are extracted so as to be subjected to DCT process so that noise frequency components are removed.

However, the former method in which the noise eliminating filter is turned on or off has a problem in that high-frequency components of the image are omitted and thus the resolution deteriorates though the process can easily be performed.

The latter method in which the adaptive noise eliminating filter is employed is able to effectively reduce block distortion while the resolution is maintained. However, a complicated process must be performed and thus cost reduction cannot be performed. Therefore, the foregoing method is not a preferred method for consumer appliances.

What is worse, there arises a problem in that the block distortion cannot completely be reduced because of an incorrect determination of the block distortion. Another problem arises in that an edge is erroneously corrected, causing pseudo edge to be formed.

The rate of bit streams encoded by the block encoding method is sometimes converted into different bit-rate bit stream from, for example, 8 Mbps to 4 Mbps in order to be adaptable to, for example, an apparatus set to a different bit rate.

When the rate of bit streams encoded by the block encoding method is converted so as to be again encoded, the encoding process is as it is performed even if block noise occurs in an image decoded by a decoder.

Therefore, when a motion vector is detected such that motion compensation is employed to perform prediction encoding in a case of re-encoding or format conversion, the accuracy to detect the motion vector deteriorates because of disturbance made by block noise.

The position at which block noise occurs depends on the position of the boundary between blocks. Therefore, when re-encoding or encoding for format is performed by using an encoding method in which the positions of the boundaries between blocks are the same such that block noise in an image in which block noise occurs is not eliminated, there arises a problem in that the block noise is furthermore highlighted in the reproduced image.

The method of block-encoding image data is exemplified by MPEG (Moving Picture Experts Group) formed by combining the DCT which uses correlation in an image, the motion compensation using correlation between frames and Huffman encoding which uses the correlation of code strings.

DISCLOSURE OF THE INVENTION

In view of the foregoing, an object of the present invention is to provide a method and an apparatus for reducing block distortion which requires a simple process and with which omission of high-frequency components can be reduced, reduction or elimination of block distortion can stably be performed, an incorrect determination occurring when block distortion is determined can be reduced, deterioration in an accuracy to detect motion vector which takes place when re-encoding is performed can be reduced and block noise can be reduced and to provide an encoding method and an encoding apparatus which are capable of reducing block noise.

To achieve the above-mentioned objects, according to one aspect of the present invention, there is provided a method of reducing block distortion which occurs when image data is block-encoded, the method comprising the steps of: detecting, from input image data, a parameter indicating a degree of difficulty in encoding; calculating, from input image data, a parameter required to determine block distortion; determining the block distortion in accordance with a result of detection of the parameter indicating the degree of difficulty in encoding and a result of the calculation of the parameter; calculating a correction value for reducing the block distortion; and correcting input image data with a correction value which corresponds to a result of the determination of the block distortion so as to produce an output.

When the parameter obtained from input image data and indicating the degree of difficulty in encoding is used to determine block distortion for the purpose of reducing the block distortion, the determination can effectively be performed and incorrect determination can be reduced.

BEST MODE FOR CARRYING OUT THE INVENTION

Embodiments of the present invention will now be described with reference to the drawings.

Figure 1:
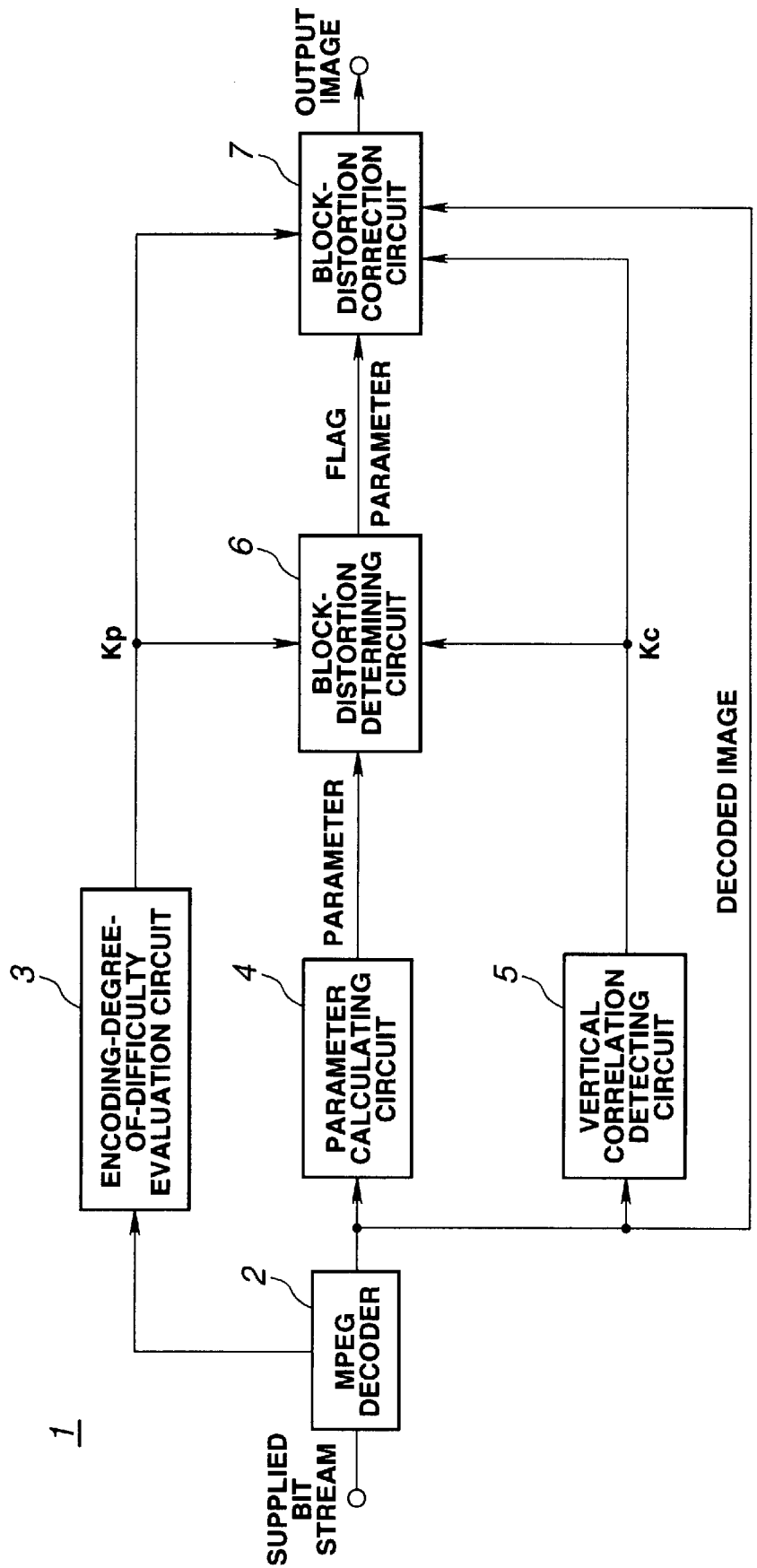
FIG. 1 is a block diagram showing an example of the structure of a block-distortion reducing apparatus according to a first embodiment of the present invention.

FIG. 1 shows the schematic structure of a block-distortion reducing apparatus 1 according to a first embodiment. The block-distortion reducing apparatus 1 shown in FIG. 1 is an example of an apparatus which includes an MPEG decoder for decoding a MPEG bit stream. That is, the block-distortion reducing apparatus 1 reduces block distortion which takes place in image data subjected to a decoding process in the MPEG decoder.

The block-distortion reducing apparatus 1 incorporates an MPEG decoder 2 for subjecting supplied image data to the decoding process; an encoding-degree-of-difficulty evaluation circuit 3 for evaluating an encoding degree of difficulty of image data subjected to the decoding process; a parameter calculating circuit 4 for calculating a parameter required to determine block distortion; a vertical correlation detecting circuit 5 for detecting the correlation of image data in the vertical direction; a block-distortion determining circuit 6 for determining a state of block distortion of image data; and a block-distortion correction circuit 7 for correcting block distortion of image data.

The MPEG bit stream is supplied to the MPEG decoder 2. The MPEG decoder 2 subjects data in the supplied bit stream to inverse quantization and inverse DCT (discrete cosine transformation) so that data is decoded. At this time, the MPEG decoder 2 decodes data in DCT block units each of which is composed of a plurality of macro blocks. The MPEG decoder 2 detects an IDCT (inverse DCT) coefficient and motion vector difference MV obtained as a result of the decoding process so as to produce an output to the encoding-degree-of-difficulty evaluation circuit 3 and the block-distortion correction circuit 7.

The encoding-degree-of-difficulty evaluation circuit 3 uses the motion vector difference MV and the IDCT coefficient supplied from the MPEG decoder 2 to generate a parameter Kp indicating the encoding degree of difficulty of image data. The motion vector difference MV is a difference of the motion vector included in the bit stream supplied to the MPEG decoder 2. The IDCT coefficient is a coefficient obtainable from inverse DCT after inverse quantization of the DCT coefficient included in the bit stream supplied to the MPEG decoder 2.

Figure 2B:
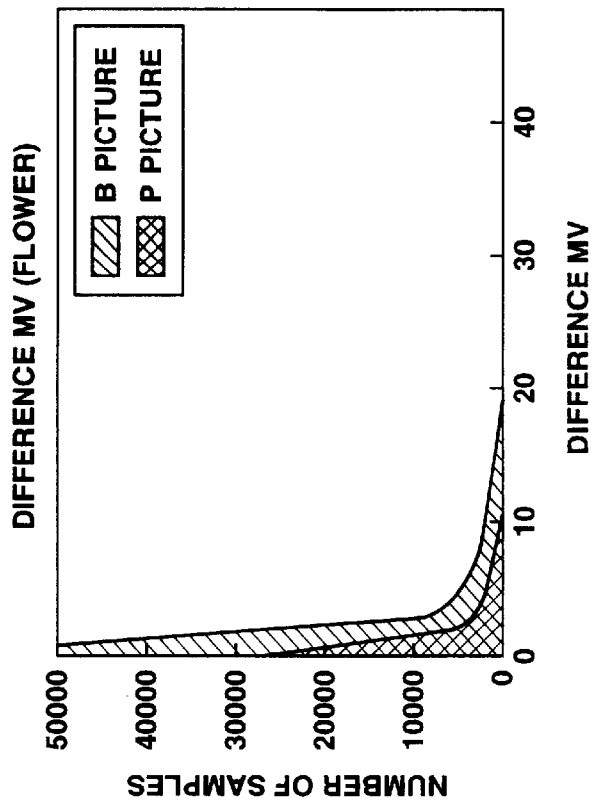
FIG. 2B is a graph showing the relationship between values of motion vector difference MV of a sample which cannot easily be encoded and the number of samples.
Figure 2A:
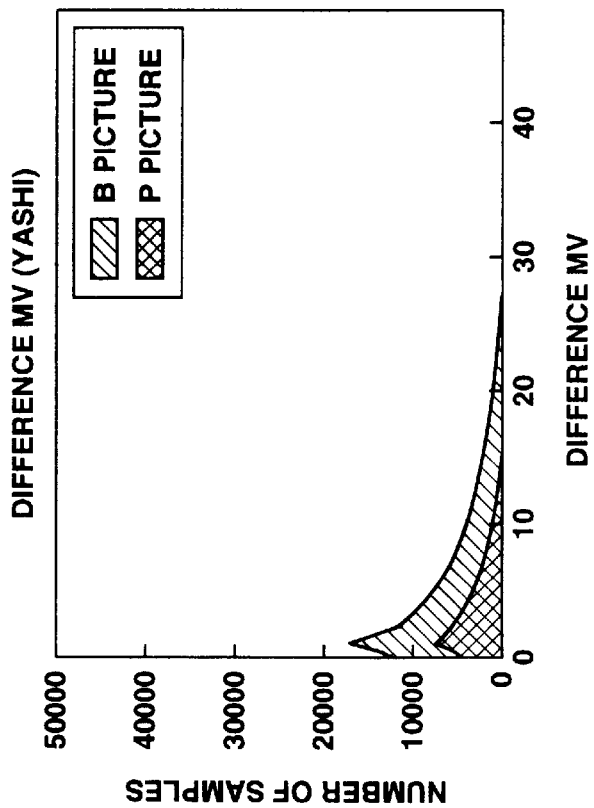
FIG. 2A is a graph showing the relationship between values of motion vector difference MV of a sample which can easily be encoded and the number of samples.
Figure 3B:
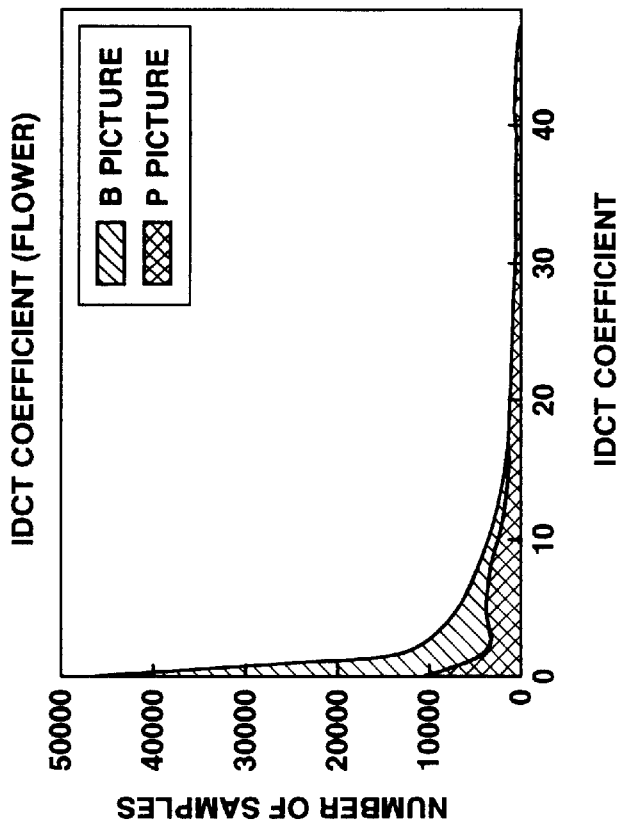
FIG. 3B is a graph showing the relationship between values of IDCT coefficients of samples which cannot easily be encoded and the number of sample.
Figure 3A:
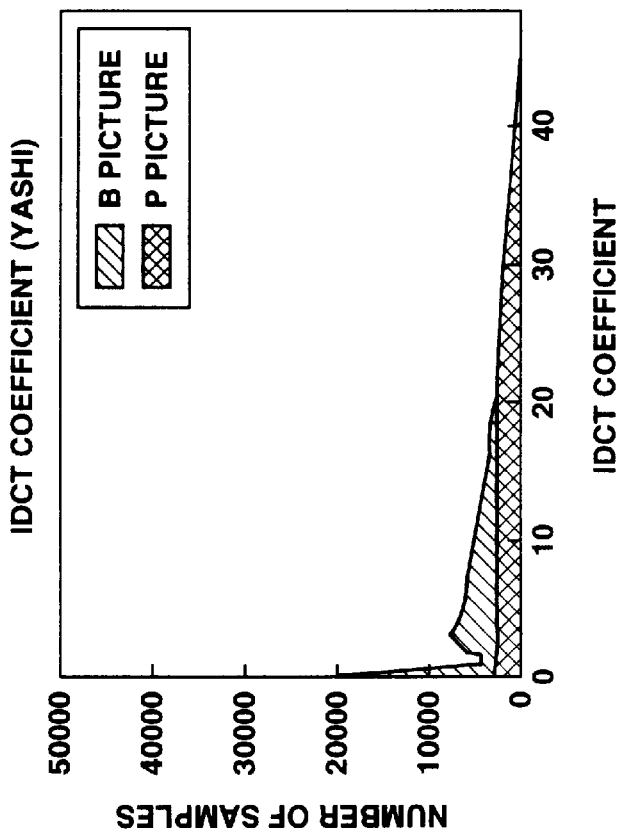
FIG. 3A is a graph showing the relationship between values of IDCT coefficients of samples which can easily be encoded and the number of sample.

The motion vector difference MV and the IDCT coefficient have the relationship as shown in FIGS. 2A, 2B, 3A and 3B to correspond to the degree of complexity of an image indicated by input image data. FIGS. 2A and 3A show the motion vector difference MV and the IDCT coefficient of a first sample (yashi) generally having a high encoding degree of difficulty. FIGS. 2B and 3B show the motion vector difference MV and the IDCT coefficient of a second sample (flower) generally having a low encoding degree of difficulty.

As shown in FIGS. 2A, 2B, 3A and 3B, in complicated macro blocks in which motion is active and macro blocks including high-frequency components, the motion vector difference MV and IDCT coefficient obtained by the MPEG decoder 2 have large values, as shown in FIGS. 2A and 3A. In moderate macro blocks in which motion is monotonous and macro blocks in which high-frequency components are few in number, the motion vector difference MV and the IDCT coefficient obtained by the MPEG decoder 2 have small values, as shown in FIGS. 2B and 3B.

Therefore, when the motion vector difference MV and the IDCT coefficient obtained by the MPEG decoder 2 are large, the encoding-degree-of-difficulty evaluation circuit 3 determines that the degree of difficulty in encoding high. Therefore, the encoding-degree-of-difficulty evaluation circuit 3 sets the parameter Kp indicating the encoding degree of difficulty to a large value. In FIGS. 2A, 2B, 3A and 3B, description has been made about only B-picture and P-picture by using the motion vector difference MV and the IDCT coefficient. As for I-picture, only the IDCT coefficient is used to set the parameter Kp indicating the encoding degree of difficulty.

Figure 4:
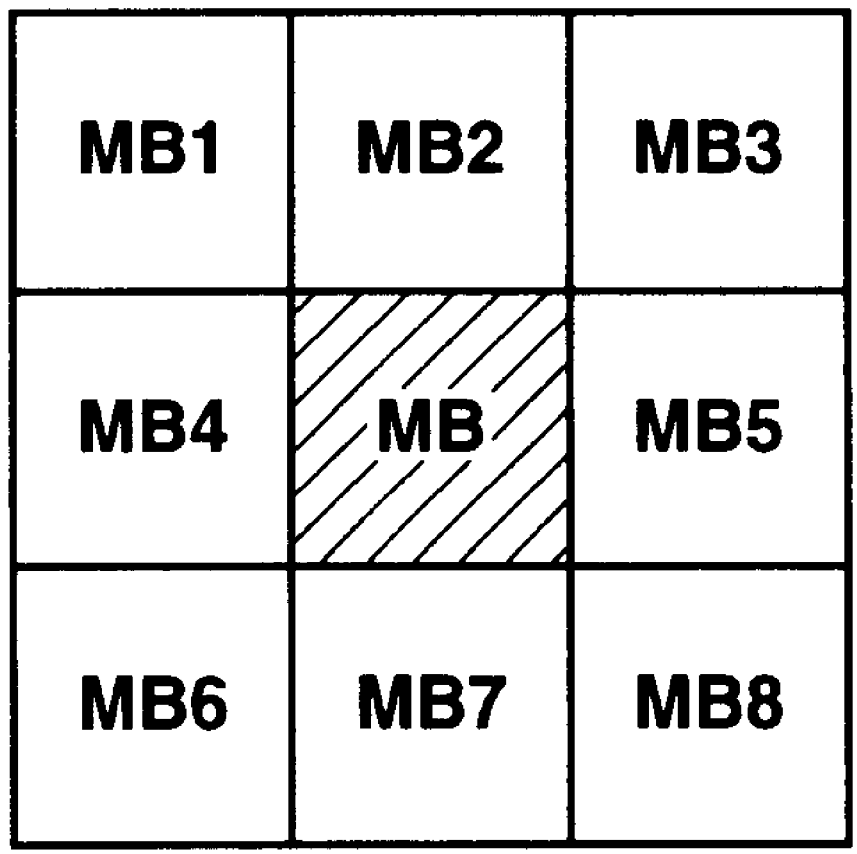
FIG. 4 is a diagram showing an example of calculations for obtaining an IDCT coefficient and a motion vector difference MV in one frame.
Figure 5:
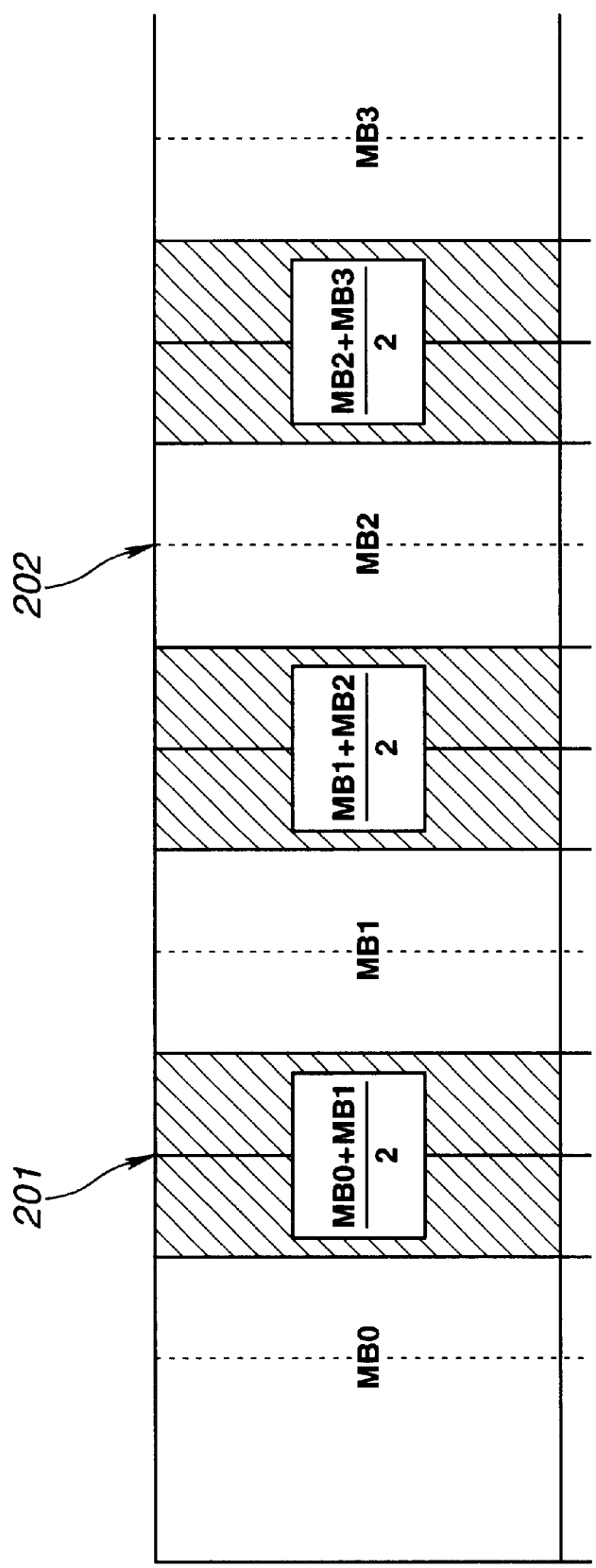
FIG. 5 is a diagram showing an example of a method of obtaining an encoding degree of difficulty in a block boundary in a vertical direction.

When the encoding-degree-of-difficulty evaluation circuit 3 sets the parameter Kp for image data in one frame, the encoding-degree-of-difficulty evaluation circuit 3 calculates the motion vector difference MV and the IDCT coefficient for each macroblock when the macro blocks are arranged as shown in FIG. 4. For example, the encoding-degree-of-difficulty evaluation circuit 3 calculates, for example, the following equation for macroblock MB0:

MB0=(MB0+MB1+MB2+MB3+MB4+MB5+MB6+MB7+MB8)/9

That is, when the motion vector difference MV and the IDCT coefficient for the macroblock MB0 shown in FIG. 4 are calculated, also the adjacent macro blocks MB1 to MB8 are considered.

The encoding-degree-of-difficulty evaluation circuit 3 calculates the parameter Kp indicating the encoding degree of difficulty of the block boundary in the vertical direction. At the macroblock boundary which is the block boundary between macro blocks, the IDCT coefficient and the motion vector difference MV of both of the macro blocks are calculated so that the parameter Kp indicating the encoding degree of difficulty is calculated. At the block boundary, the IDCT coefficient and the motion vector difference MV of the macroblock are as it is employed as the parameter Kp indicating the encoding degree of difficulty. The vertical correlation detecting circuit 5 decodes the level of correlation of the edge in a direction along the block boundary. The parameter Kp is set to a multiplicity of values in a range from 0 to 1 so as to be enlarged in proportion to the encoding degree of difficulty.

That is, a supplied brightness signal is supplied to a HPF (High-Pass Filter) in the edge extracting portion so that secondary differentiation for detecting an edge is performed. For example, the Laplacian is used to extract edge elements. A signal indicating a result of edge extraction by the HPF is supplied to a maximum-value extracting portion. To obtain a threshold value which is necessary for the following binary-coding portion, a maximum value is detected in an edge extracting blocks across the block boundary. The binary coding portion receives the threshold value obtained by the maximum value extracting portion and the signal indicating a result of the edge extraction performed by the HPF. In accordance with the threshold value, the signal is binary-coded. The HPF, the edge extracting portion, the maximum value extracting portion and the binary-coding portion will be described later.

The vertical correlation detecting circuit 5 obtains the level of the vertical correlation of the thus-extracted edge component at the block boundary. An example of a method of obtaining the level of the vertical correlation will now be described with reference to FIG. 6.

Figure 6:
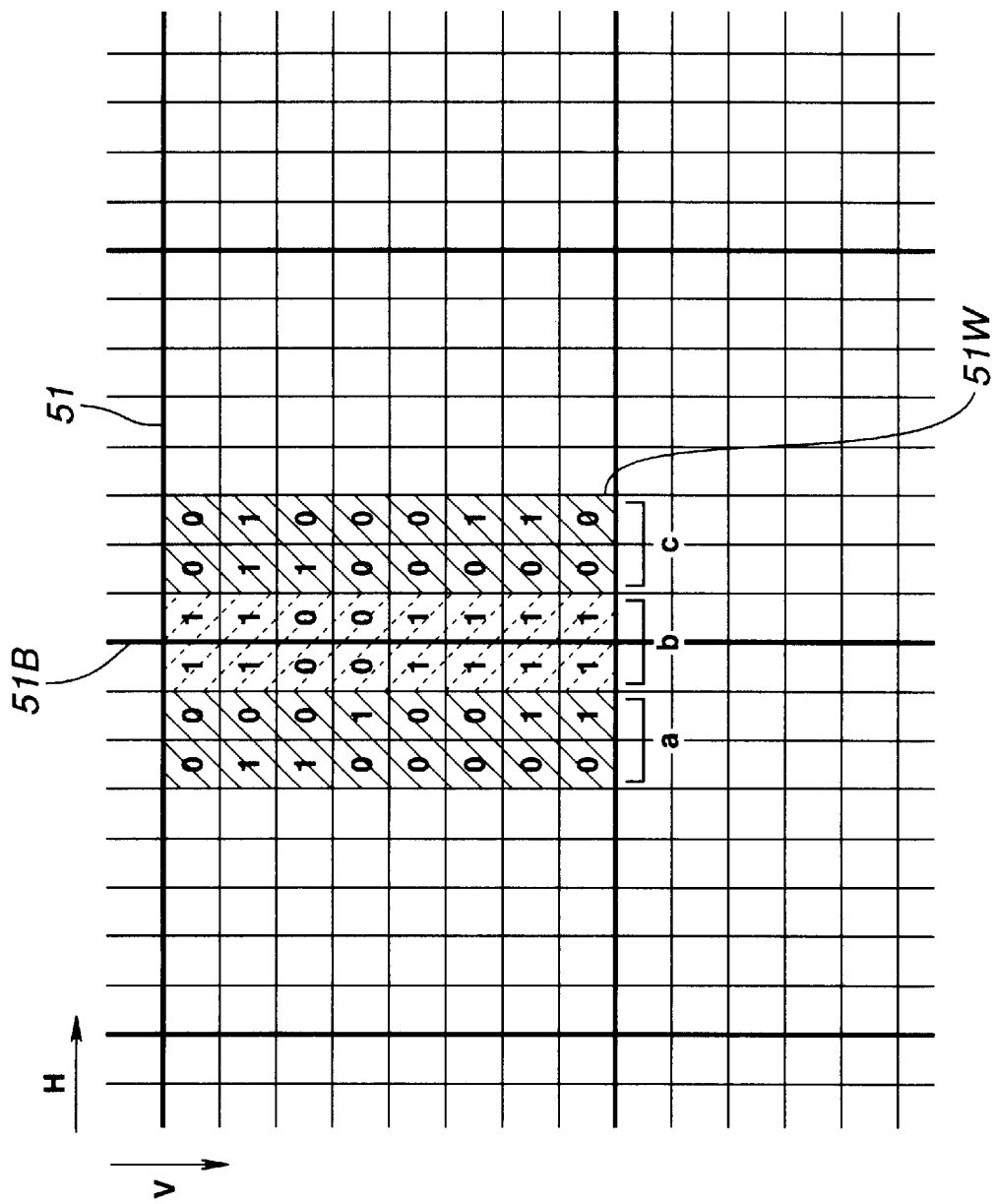
FIG. 6 is a diagram showing pixels in the vicinity of a DCT block boundary for describing a method of obtaining the degree of vertical correlation.

Referring to FIG. 6, division is made into region b including a block boundary of interest and regions a and c adjacent to the region b. The number of the extracted edge components is calculated for each region. The obtained numbers are made to be Ea, Eb and Ec. In FIG. 6, pixels extracted as edges are expressed as 1 and pixels determined that the pixels are not edges are expressed as 0. In this embodiment, Ea =5,Eb=12 and Ec=5.

The vertical correlation detecting circuit 5 may produce an output of the detected level of the vertical correlation as the degree of difficulty when the level of the detection of the correlation is encoded to the block-distortion correction circuit 7 as well as the output to the block-distortion determining circuit 6. That is, a consideration is made that the encoding degree of difficulty is raised in proportion to the level of the vertical correlation which is detected by the vertical correlation detecting circuit 5. Thus, a parameter corresponding to the vertical correlation is supplied to the block-distortion correction circuit 7. Thus, the correction value calculated by the block-distortion correction circuit 7 is multiplied with the supplied parameter.

Ratio Kv of the number of edge components in the region including the block boundary and that in another region is obtained so as to be classified.

Figure 16:
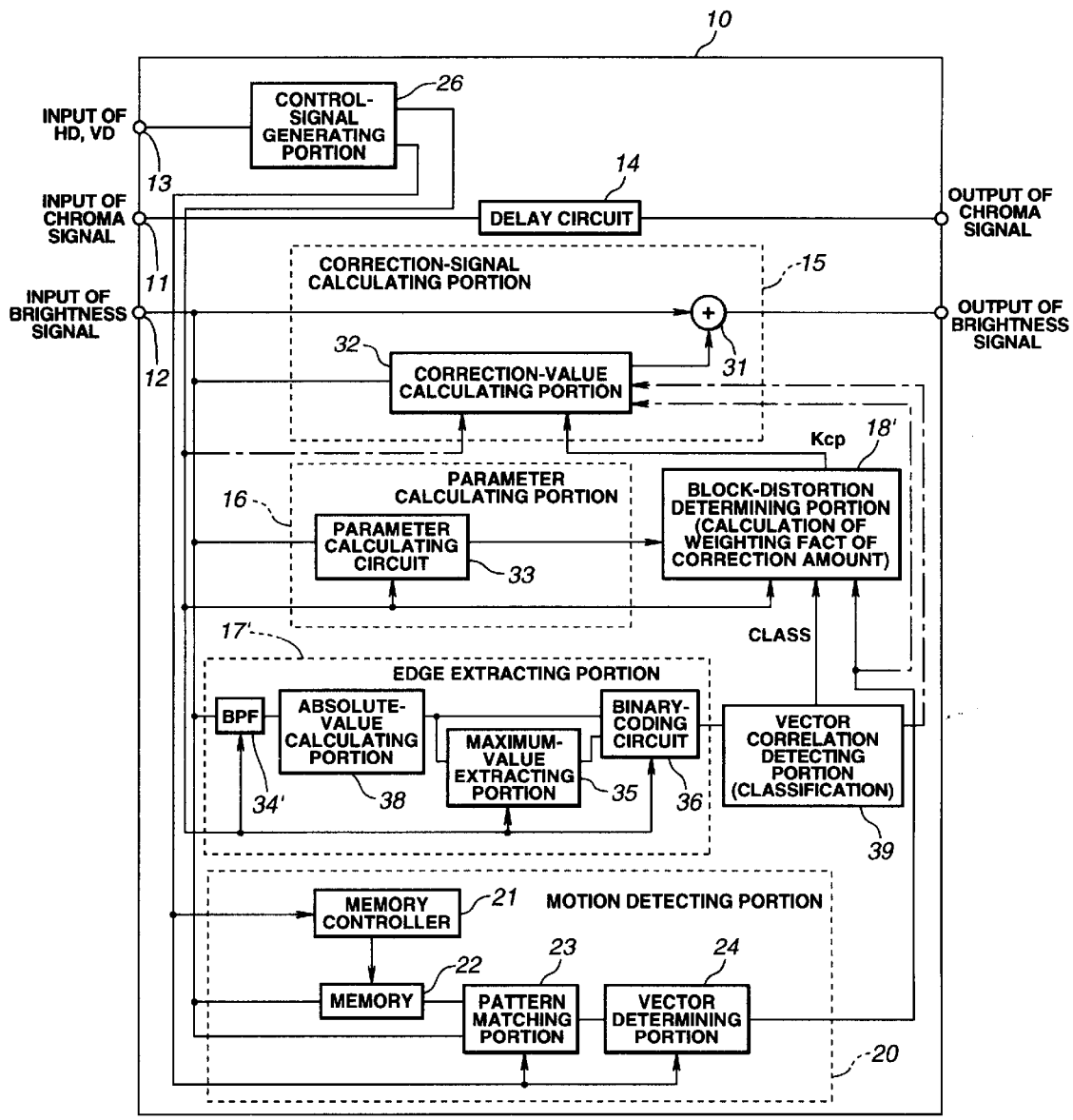
FIG. 16 is a block diagram showing the schematic structure of the apparatus for reducing block distortion of image data when the edge extraction shown in FIG. 15 is performed.

For example,
When Kv≧4 Class 1
When 2≦Kv<4 Class 2
When 1≦Kv<2 Class 3
When Kv<1 Class 4
Since Kv=(2×12)/(5+5)=2.4 in an example shown in FIG. 16, the class is Class 2.

The role of the block-distortion determining circuit 6 will now be described. Weighting factor Kc is assigned to correspond to each class. The weighting factor Kc for each class is exemplified as follows:

| Class | Weighting Factor Kc |
|---|---|
| 1 | 1 |
| 2 | 0.75 |
| 3 | 0.5 |
| 4 | 0.25 |

Therefore, when the level of the vertical correlation at the block boundary is high, an amount of correction is enlarged. Therefore, block distortion can effectively be removed. That is, the accuracy to detect the block distortion can be improved.

As shown in FIG. 1, image data subjected to the decoding process is supplied to the block-distortion determining circuit 6 from the MPEG decoder 2.

Pixels for use to determine the block distortion will now be described with reference to FIG. 7. In an example shown in FIG. 7, the DCT ending is employed in block encoding and a specific example of a subject which must be processed is shown in a case where a DCT block is composed by 8×8 pixels. That is, when five pixels from the block boundary of each of the left and right DCT blocks 51L and 51R shown in the drawings to the right and left are used in a process for reducing the block distortion and when four pixels from each of the block boundary are included in a range which must be corrected, an edge extraction block 52 is an 8×8 block around the block boundary. A block-distortion correction block 53 is a block in the edge extraction bock 52 composed of 8 pixels upper by one line.

The block-distortion determining circuit 6 calculates a parameter required to determine the block distortion. The block-distortion determining circuit 6 calculates boundary difference |tmp0|, activity |tmp| and adjacent difference |diff| from the following equations as the parameters:

$$|tmp0|=|f-e|$$

$$|tmp|=(|b-a|+|c-b|+|d-c|+|e-d|+|g-f|+|h-g|+|i-h|+|j-i|)/8$$

$$|diff0|=|b-a|$$

$$|diff1|=|c-b|$$

$$|diff2|=|d-c|$$

$$|diff3|=|e-d|$$

$$|diff4|=|g-f|$$

$$|diff5|=|h-g|$$

$$|diff6|=|i-h|$$

$$|diff7|=|j-i|$$

Figure 7:
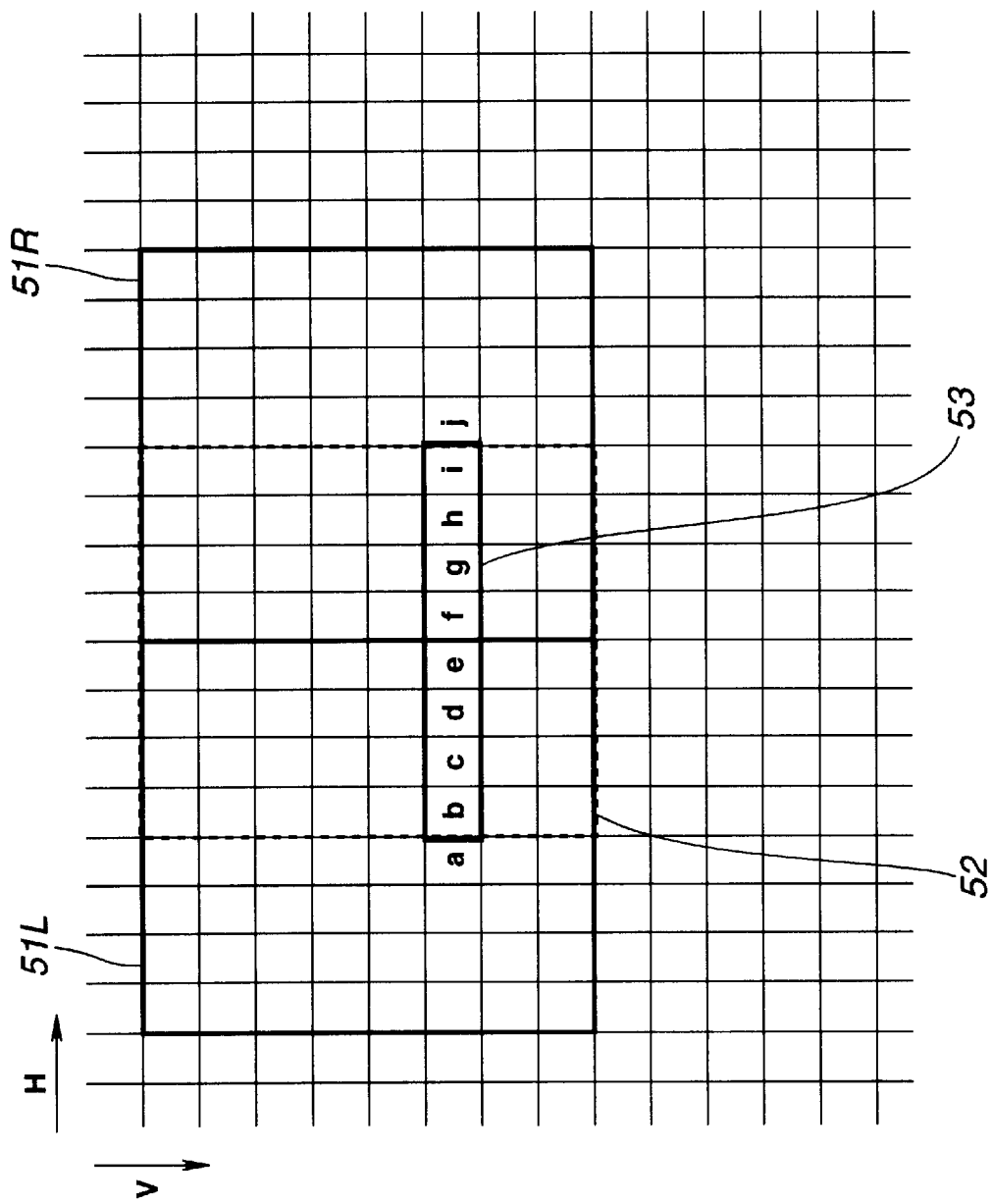
FIG. 7 is a diagram showing pixels in the vicinity of a block boundary for correcting block distortion.

As can be understood from the foregoing equations, the boundary difference |tmp0| is an absolute value of the difference between adjacent pixels e and f across the boundary of the DCT block shown in FIG. 7. The activity |tmp| is an average value of the absolute value of the difference between adjacent pixels (except for a region between e and f) of the block distortion processing block 53. The adjacent difference |diff| is an absolute value of each of the differences between pixels c and d, between d and e, between f and g and between g and h. The block-distortion determining circuit 6 produces an output of each of the parameters to the block-distortion correction circuit 7.

The block-distortion determining circuit 6 uses the parameter Kp supplied from the encoding-degree-of-difficulty evaluation circuit 3, each parameter supplied from the parameter calculating circuit 4 and the weighting factor Kc supplied from the vertical correlation detecting circuit 5 to determine whether or not block distortion exists. Moreover, the block-distortion correction circuit 7 has threshold value det_th for use to determine whether or not the block distortion correction is performed.

Specifically, the block-distortion determining circuit 6 determines that the block boundary has a stepped portion when |tmp0|>|tmp| is satisfied. The block-distortion determining circuit 6 determined that the block boundary has not edge when |tmp0|<det_th is satisfied. When a determination is made that |tmp0|≦|diff3| and |tmp0|≦|diff4| are satisfied, the block-distortion determining circuit 6 determines that no edge exists on the two sides of the block boundary.

The block-distortion determining circuit 6 uses the weighting factor Kc and Kp so as to change the threshold value det_th for determining block distortion correction. Then, the block-distortion determining circuit 6 turns a flag corresponding to the result of the determination on so as to control the block-distortion correction circuit 7.

The block-distortion correction circuit 7 uses the flag turned on by the block-distortion determining circuit 6, the parameter Kp supplied from the encoding-degree-of-difficulty evaluation circuit 3 and the weighting factor Kc supplied from the vertical correlation detecting circuit 5 so as to calculate a correction value with which image data having the block distortion is corrected. Moreover, the block-distortion correction circuit 7 has a threshold value corr_th for use to correct the block distortion. In accordance with the characteristics of the image, in particular, the linearity of the same, the block-distortion correction circuit 7 obtains, from the adjacent difference, boundary step |step| after the correction from the following equation:

$$|step|=|diff3+diff4|/2$$

Then, a correction amount |σ| required to realize the foregoing block step |step| after the correction is obtained from the following equation:

$$|σ|=(|tmp0|-|step|)/2.$$

It is preferable that the above-mentioned boundary difference |tmp0| is determined with the parameter threshold value corr_th so as to switch the intensity of the correction. In the foregoing case, when |tmp0|<corr_th is satisfied and the intensity of the correction is high (intense correction), the correction amount |σ| is made to be as follows:

$$|σ|=(|tmp0|-|step|)/2$$

When |tmp0|≦corr_th is satisfied and the intensity of the correction is low (weak correction), the correction amount |σ| is halved as follows:

$$|σ|=(|tmp0|-|step|)/4$$

The correction is performed as described above. The block-distortion correction circuit 7 may calculate |σ| with the weighting factor Kc and the parameter Kp so as to determine the correction amount |σ| in consideration of the IDCT coefficient, the motion vector difference MV and the vertical correlation. The block-distortion correction circuit 7 may change the threshold value corr_th in accordance with Kc and Kp.

Since there is apprehension that an incorrect determination is made in the block distortion determination if the boundary difference |tmp0| is larger than the parameter threshold value corr_th though an edge exists in the block boundary, the incorrect correction must be reduced. Therefore, the intensity of the correction is switched between intense and weak.

In accordance with the obtained correction amount |σ|, the block-distortion correction circuit 7 obtains a correction value for each pixel. To smooth the seam with an adjacent correction range, and since the block distortion becomes intense in the portion adjacent to the boundary, a correction value in inverse proportion to the distance from the boundary is obtained in accordance with the following equation.

Specifically, when correction value are $|σ_b|$ to $|σ_i|$ for pixels b to i in the correction range 53 shown in FIG. 6, the foregoing correction value |σ| is used to obtain the following correction values:

$$|σ_e|=|σ|, |σ_f|=|σ|$$

$$|σ_d|=|σ|/2, |σ_g|=|σ|/2$$

$$|σ_c|=|σ|/4, |σ_h|=|σ|/4$$

$$|σ_b|=|σ|/8, |σ_i|=|σ|/8$$

Then, the block-distortion correction circuit 7 uses the correction values $|σ_b|$ to $|σ_i|$ for the pixels b to i so as to obtain image signals (image data) $SB_b$ to $SB_i$ which have been subjected to the block distortion correction.

Specifically, when input image data for the pixels b to i before the correction are $S_b$ to $S_i$, the block-distortion correction circuit 7 performs correction of image data supplied from the MPEG decoder 2 such that corrected image data $SB_b$ to $SB_i$ are made as follows to correspond to the sign of tmp0:

$tmp0 \geq 0: SB_b = S_b + |\sigma_b|, tmp0 < 0: SB_b = S_b - |\sigma_b|$ $tmp0 \geq 0: SB_c = S_c + |\sigma_c|, tmp0 < 0: SB_c = S_c - |\sigma_c|$ $tmp0 \geq 0: SB_d = S_d + |\sigma_d|, tmp0 < 0: SB_d = S_d - |\sigma_d|$ $tmp0 \geq 0: SB_e = S_e + |\sigma_e|, tmp0 < 0: SB_e = S_e - |\sigma_e|$ $tmp0 \geq 0: SB_f = S_f - |\sigma_f|, tmp0 < 0: SB_f = S_f + |\sigma_f|$ $tmp0 \geq 0: SB_g = S_g - |\sigma_g|, tmp0 < 0: SB_g = S_g + |\sigma_g|$ $tmp0 \geq 0: SB_h = S_h - |\sigma_h|, tmp0 < 0: SB_h = S_h + |\sigma_h|$ $tmp0 \geq 0: SB_i = S_i - |\sigma_i|, tmp0 < 0: SB_i = S_i + |\sigma_i|$ Therefore, the above-mentioned block-distortion reducing apparatus 1 is able to determine the block distortion and correct the block distortion by using the IDCT coefficient and the motion vector difference MV supplied from the MPEG decoder 2 and the parameter Kp indicating the encoding degree of difficulty. Therefore, block distortion can stably be reduced or eliminated. Moreover, incorrect determination of the block distortion can be reduced.

Figure 8:
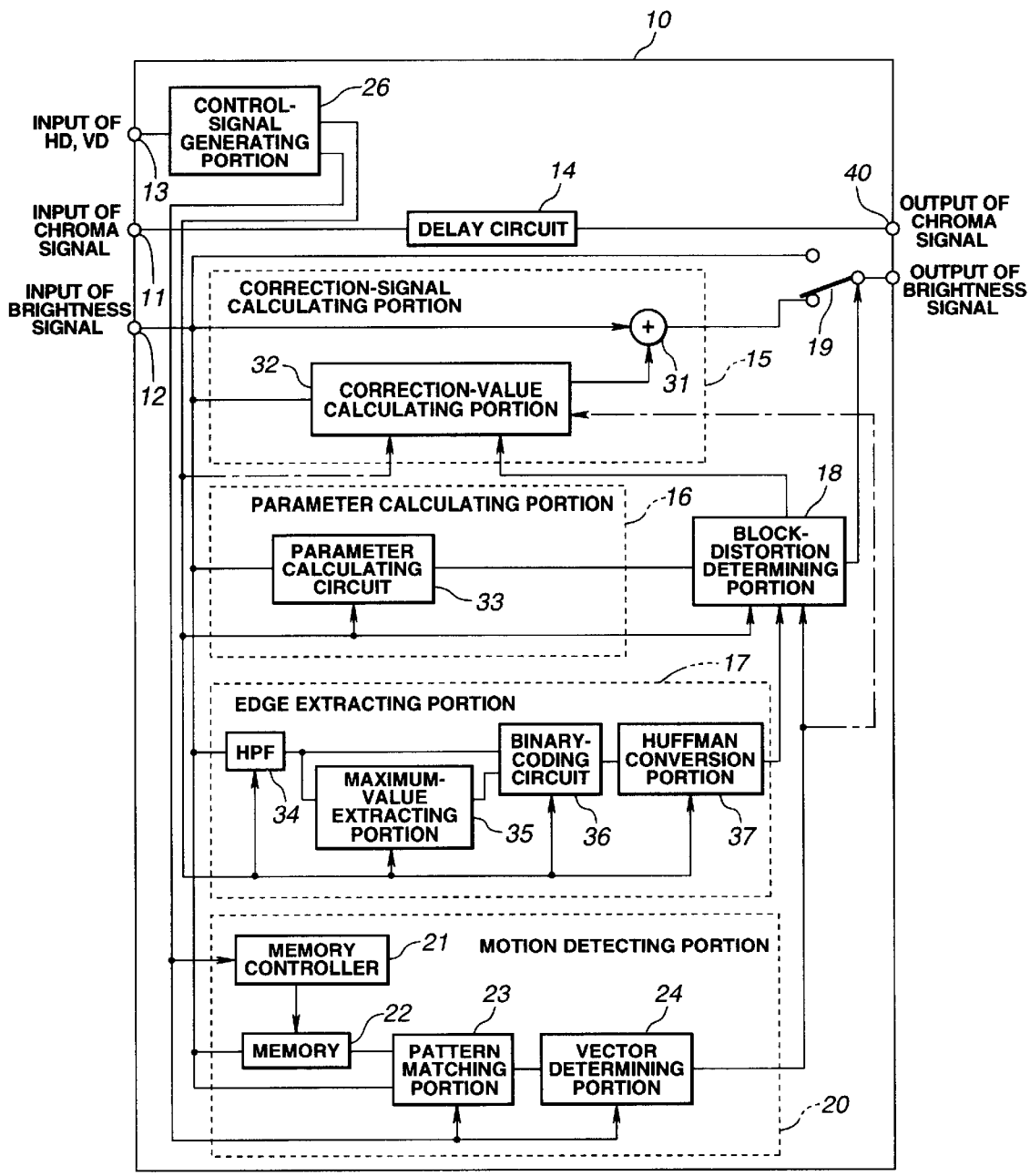
FIG. 8 is a block diagram showing the schematic structure of an apparatus for reducing block distortion of image data according to a second embodiment of the present invention.

FIG. 8 is a block diagram showing the schematic structure of a block-distortion reducing apparatus 10 according to a second embodiment. Note that the block distortion reduction is also called a block distortion elimination or block noise elimination.

Referring to FIG. 8, input terminals 11 and 12 are supplied with an image signal subjected to image encoding including block encoding and then decoded, a chroma signal of image data and a brightness signal. Image encoding including block encoding is exemplified by a so-called MPEG encoding standard. The MPEG is an abbreviation of an organization (Moving Picture Experts Group) for investigating of dynamic image compression encoding of ISO/IEC JTC1/SC29 (International Organization for Standardization/International Electrotechnical Commission, Joint Technical Committee 1/Sub Committee 29: International Standardization Organization/International Electronic Standard Conference, Associated Technical Committee/Expert Department 29). As MPEG 1 standard, ISO11172 is employed, while ISO13818 is employed as MPEG 2 standard. In the above-mentioned international standards, ISO11172-1 and ISO13818-1 have been standardized in a category of multimedia multiplexing. In addition, ISO11172-2 and ISO13818-2 have been standardized in the category of image. Moreover, ISO11172-3 and ISO13818-3 have been standardized in a category of sound.

The foregoing image compression and encoding standard ISO11172-2 or ISO13818-2 has a structure that an image is compressed and encoded in picture (frame or field) units by using the correlation in a period of time or a spatial direction of an image. The use of the correlation in the spatial direction is realized by using block DCT encoding.

As described above, the compression and encoding process including, for example, block DCT encoding is performed so as to be serial-transmitted for recorded/reproduced. Then, chroma (color) components and brightness components of image signal data subjected to the inverse DCT in the decoder are supplied to a chroma-signal input terminal 11 and a brightness signal input terminal 12 shown in FIG. 8.

The chroma (color) components of image data supplied to the chroma-signal input terminal 11 are extracted from a chroma-signal output terminal 40 through a delay circuit 14. The delay circuit 14 delays time of the brightness component required for the block distortion reducing process so that timing of the output brightness correction and that of the chroma component are made coincide with each other.

A HD.VD input terminal 13 is supplied with a horizontal synchronizing signal and a vertical synchronizing signal so as to be supplied to a control-signal generating portion 26 so that timing signals required for the circuits are generated.

The brightness signal supplied from the terminal 12 is transmitted to a correction-signal calculating portion 15, a parameter calculating portion 16, an edge extracting portion 17, a selection switch 19 and a motion detecting portion 20.

The correction-signal calculating portion 15 transmits the supplied brightness signal to an adder 31 and a correction-value calculating portion 32. The correction-value calculating portion 32 predict inclination after the correction in accordance with the adjacent difference between two adjacent pixel across the boundary so as to obtain a correction value. In accordance with information about whether the correction is intense or weak communicated from the block-distortion determining portion, the correction-value calculating portion 32 obtains a corresponding degree of correction. Moreover, the correction-value calculating portion 32 obtains a correction value for each pixel in inverse proportion to the distance of the boundary. A correction value obtained by the correction-value calculating portion 32 is supplied to the adder 31 so as to be added to the above-mentioned input brightness signal.

The supplied brightness signal is supplied to a HPF (High-Pass Filter) 34 of the edge extracting portion 17 so that secondary differential for detecting edge elements is performed. In the second embodiment, for example, the Laplacian is employed to extract edge elements. A signal indicating a result of edge extraction in the HPF 34 is supplied to a maximum-value extracting portion 35. To obtain a threshold value required for the following binary-coding circuit 36, a maximum value is detected in an edge extracting block across the block boundary.

The binary-coding circuit 36 is supplied with the threshold value obtained by the maximum-value extracting portion 35 and the signal indicating a result of edge element extraction performed by the HPF 34. In accordance with the threshold value, the binary-coding circuit 36 binary-codes the signal. A Huffinan conversion portion 37 performs Huffinan conversion in the edge extracting blocks across the block boundary in accordance with the binary-coded signal. Thus, the edge elements are mapped to a parameter space ($\rho$, $\theta$) so that a straight line ($\rho 0$, $\theta 0$) in the block is obtained. The obtained $\rho 0$ and $\theta 0$ are supplied to the block-distortion determining portion 18.

The brightness signal supplied from the terminal 12 is supplied to a parameter calculating circuit 33 of the parameter calculating portion 16 so that a parameter in the correction block required for the block-distortion determining portion 18 is obtained.

The supplied brightness signal is supplied to a memory 22 of the motion detecting portion 20 so that writing is performed under control of the memory controller 21. A brightness signal in the previous field read from the memory by the memory controller 21 is supplied to a pattern matching portion 23. Thus, pattern matching with the supplied brightness signal is performed. A result of the calculations for performing pattern matching is supplied to a vector determining portion 24 so that the degree of the motion is determined. Information whether or not motion exists is supplied to the block-distortion determining portion 18. Moreover, the motion detecting portion 20 may detect the motion vector difference MV to produce, to the block-distortion determining portion 18 and a correction-value calculating portion 32, an output of the same as a parameter indicating the encoding degree of difficulty in accordance with the motion vector difference MV.

The block-distortion determining portion 18 uses the straight line component ($\rho 0$, $\theta 0$) communicated from the edge extracting portion, the parameter in the correction block communicated from the parameter calculating portion and the degree of motion communicated from the motion vector detecting portion to determine whether or not block distortion occurs and whether the block-distortion correction value is controlled (weak) or not (intense). Then, the block-distortion determining portion 18 supplies an intense correction/weak correction signal to the correction-value calculating portion 32 of the correction-signal calculating portion 15. Moreover, the block-distortion determining portion 18 supplied correction ON/OFF signal to a control terminal of the selection switch (a selector) 19.

The supplied brightness signal is supplied to the adder 31 of the correction-signal calculating portion 15 so that the brightness signal and the correction value obtained by the correction-value calculating portion 32 are added to each other. Thus, a signal indicating a result of removal of the block distortion is obtained, the signal being then supplied to the selection switch (the selector) 19.

The selector 19 selects whether the supplied brightness signal is as it is transmitted or a corrected signal is transmitted in response to a block distortion ON/OFF signal supplied from the block-distortion determining portion 18.

On the other hand, the supplied chroma signal is supplied to the delay circuit 14 so that delay from the brightness signal which passes through a correction circuit is corrected.

Another method may be employed in which the selector 19 is not employed such that the correction signal which is an output of the correction-value calculating portion 32 is made to be zero when the block distortion ON/OFF signal supplied from the block-distortion determining portion 18 is OFF.

Although the noise eliminating apparatus according to the second embodiment shown in FIG. 8 is arranged to subject only the brightness signal to the block-distortion reducing process, also the chroma signal may be subjected to a similar process.

Figure 9:
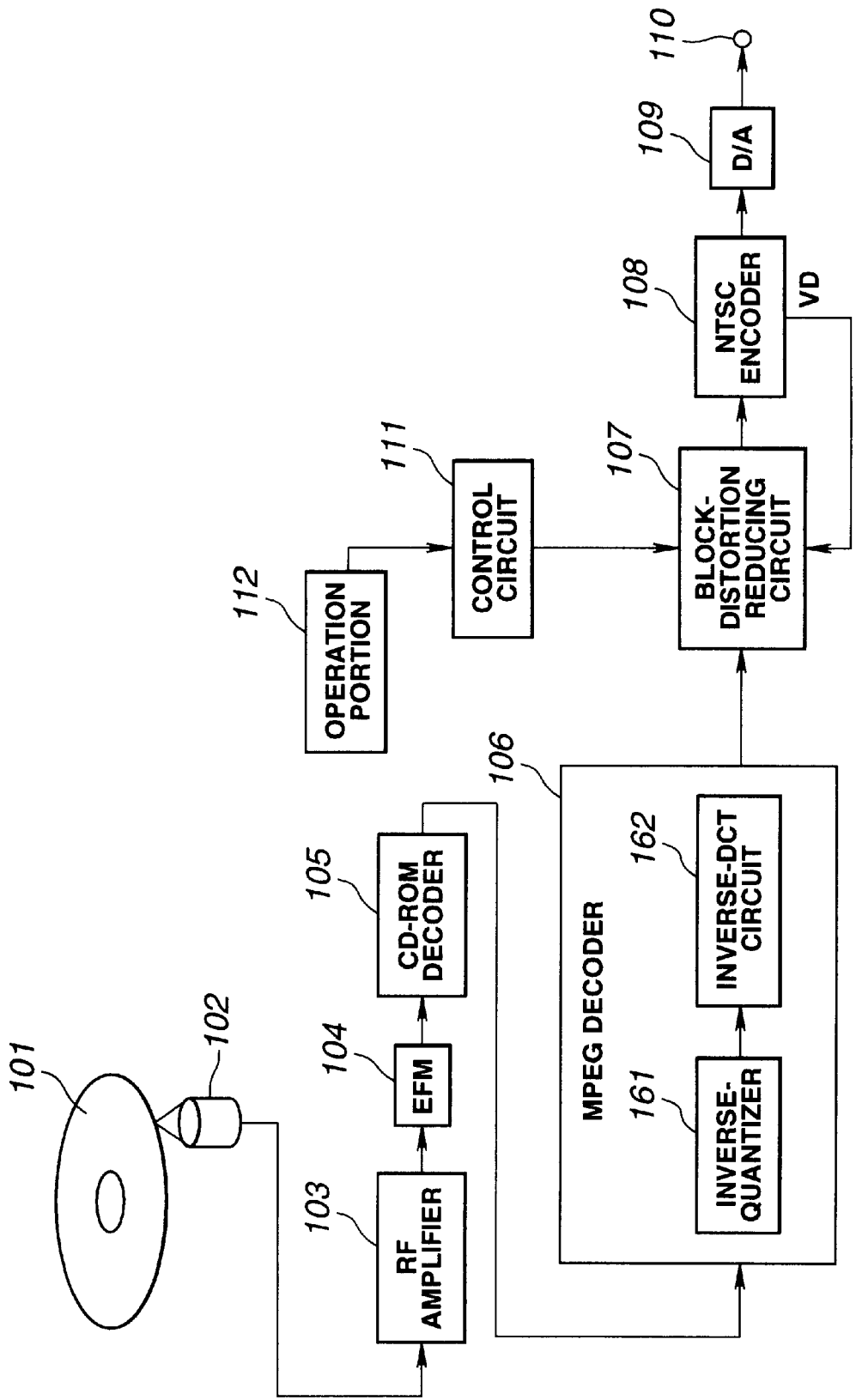
FIG. 9 is a block diagram showing the schematic structure of a decoder system incorporating the apparatus for reducing block distortion of image data according to the second embodiment of the present invention.

The block-distortion reducing apparatus 10 having the structure as shown in FIG. 8 may be employed as a block-distortion reducing circuit 107 of a video CD player as shown in FIG. 9.

Referring to FIG. 9, an RF signal read from a disk 101, such as a video CD or a CD-ROM, by an optical pickup 102 is supplied to an RF amplifier 103. The thus-amplified RF signal is demodulated by an EFM demodulating (8–14 demodulation) circuit 104 so as to be formed into serial data which is supplied to, for example, a CD-ROM decoder 105 which is a decoder adapted to a disk recording format.

The CD-ROM decoder 105 converts serial data into, for example, an MPEG bit stream signal so as to transmit the MPEG bit stream signal to an MPEG decoder 106. The MPEG is a method using the correlation of time and spatial direction of an image to perform compression and encoding, as described above. To use the correlation in the spatial direction, the block DCT code is employed. The MPEG decoder 106 performs decoding in accordance with the format, for example, MPEG 1. When the decoding process is performed, an inverse-DCT circuit 162 inverse-DCT data after an inverse-quantizer 161 has inversely quantized data. If necessary, processes including interpolation are performed, and an output is produced.

An image signal transmitted from the MPEG decoder 106 is supplied to a block-distortion reducing circuit 107 which is a noise reducer. Since the signal contains noise occurring when the compression/expansion have been performed in accordance with MPEG, the block-distortion reducing circuit 107 eliminates noise. As the block-distortion reducing circuit 107, a structure according to the present invention as shown in FIG. 9 is applied.

After the process has been performed by the block-distortion reducing circuit 107, a synchronizing signal is added by an NTSC encoder 108. Moreover, the chroma signal is modulated. Thus, an NTSC image signal is generated. The NTSC image signal is transmitted to an output terminal 110 through a D/A converter 109.

In relation to the block-distortion reducing circuit 107, a control circuit 111 comprising a microcomputer is provided. A control signal is supplied to the control circuit 111 from an operation portion 112. The operation portion 112 is provided with a control switch for reducing noise, for example, reducing block distortion. Thus, the block distortion reduction is ON/OFF. The control circuit 111 is usually used to control another circuit of the block-distortion reducing circuit 107, for example, the MPEG decoder 106.

An algorithm for block-distortion reducing process which is performed by the block-distortion reducing apparatus 10 having the structure as shown in FIG. 8 will now be described.

Figure 10:
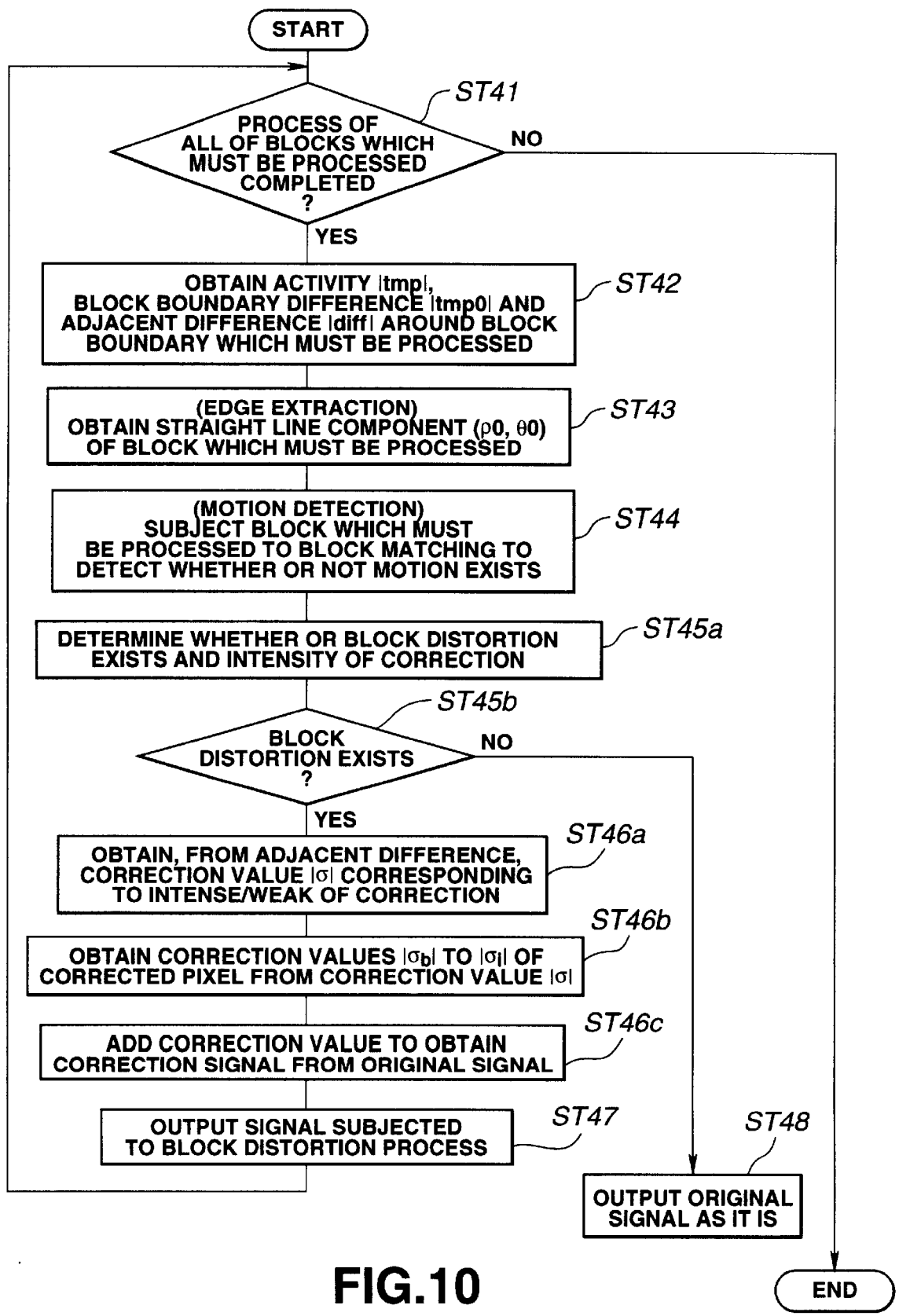
FIG. 10 is a flow chart of a process of a block distortion reduceive method according to the second embodiment of the present invention.

FIG. 10 is a flow chart for describing the algorithm of a block-distortion reducing method according to the embodiment of the present invention. In the example shown in FIG. 10, an algorithm of a process in a H (horizontal) direction is described. As for an algorithm for reducing block distortion in a V (vertical) direction is similar to the foregoing algorithm except for the process in the horizontal direction is being changed to the vertical direction, it is omitted from description.

Referring to FIG. 10, in step ST41 whether or not the block-distortion reducing process for all of block boundaries in the horizontal direction have been completed is determined. If an affirmative determination is made, the process is completed. If a negative determination is made, the process proceeds to next step ST42.

The pixels for use in the block-distortion reducing process are similar to those described in the first embodiment shown in FIG. 7. In the first step ST41 shown in FIG. 10, whether or not the block-distortion reducing process for all of the correction process blocks 53 have been completed is determined.

In step ST42 boundary difference |tmp0|, activity |tmp| and adjacent difference |diff| which are parameters required to determine whether or not block distortion has taken place are obtained in accordance with equations similar to those employed in the first embodiment.

In step ST43 edge extraction in the edge extraction block 52 corresponding to the correction process block is performed so that a straight component ($\rho 0$, $\theta 0$) is obtained. The edge extracting process will be described later.

Then, the operation proceeds to step ST44 so that the degrees of motion vector of two DCT blocks 51L and 51R across the correction process block are examined. The motion vector detecting operation will be described later.

In step ST45a the parameter, the straight component ($\rho 0$, $\theta 0$) and the degree of the motion vector obtained in the corresponding steps ST42, ST43 and ST44 are used to determine whether or not block distortion exists in the block boundary. Moreover, a process for determining the intensity of the correction is performed. An example of the block-distortion reducing process will be described later.

If a determination is made in next step ST45b that block distortion takes place, the operation proceeds to step ST46a. If a determination is made that no block distortion takes place, the operation proceeds to step ST48.

If a determination is made that block distortion takes place, the operation proceeds to step ST46a so that boundary step |step| after the correction is obtained in accordance with the characteristics of the image, in particular, the linearity of the same from the following equation similarly to the first embodiment:

$$|step|=|diff3+diff4|/2$$

Then, a correction amount $|\sigma|$ required to realize the foregoing block step |step| after the correction is obtained from the following equation:

$$|\sigma|=(|tmp0|-|step|)/2.$$

It is preferable that the above-mentioned boundary difference |tmp0| is determined with the parameter threshold value corr_th so as to switch the intensity of the correction. In the foregoing case, when |tmp0|<corr_th is satisfied and the intensity of the correction is high (intense correction), the correction amount $|\sigma|$ is made to be as follows:

$$|\sigma|=(|tmp0|-|step|)/2$$

When $|tmp0| \geq$ corr_th is satisfied and the intensity of the correction is low (weak correction), the correction amount $|\sigma|$ is halved as follows:

$$|\sigma|=(|tmp0|-|step|)/4$$

In step ST46b, in accordance with the obtained correction amount $|\sigma|$, a correction value for each pixel is obtained. To smooth the seam with an adjacent correction range, and since the block distortion becomes intense in the portion adjacent to the boundary, a correction value in inverse proportion to the distance from the boundary is obtained in accordance with the following equation, similarly to the first embodiment.

Specifically, when correction value are $|\sigma_b|$ to $|\sigma_i|$ for pixels b to i in the correction range 53 shown in FIG. 6, the foregoing correction value $|\sigma|$ is used to obtain the following correction values:

$$|\sigma_e|=|\sigma|, |\sigma_f|=|\sigma|$$

$$|\sigma_d|=|\sigma|/2, |\sigma_g|=|\sigma|/2$$

$$|\sigma_c|=|\sigma|/4, |\sigma_h|=|\sigma|/4$$

$$|\sigma_b|=|\sigma|/8, |\sigma_i|=|\sigma|/8$$

In next step ST46c, the correction values $|\sigma_b|$ to $|\sigma_i|$ for the pixels b to i obtained in step ST46b are used to obtain image signals (image data) $SB_b$ to $SB_i$ which have been subjected to the block distortion correction.

Specifically, when input image data for the pixels b to i before the correction are $S_b$ to $S_i$, the block-distortion correction circuit 7 performs correction of image data supplied from the MPEG decoder 2 such that corrected image data $SB_b$ to $SB_i$ are made as follows to correspond to the sign of tmp0:

$$tmp0 \geq 0: SB_b=S_b+|\sigma_b|, tmp0<0: SB_b=S_b-|\sigma_b|$$

$$tmp0 \geq 0: SB_c=S_c+|\sigma_c|, tmp0<0: SB_c=S_c-|\sigma_c|$$

$$tmp0 \geq 0: SB_d=S_d+|\sigma_d|, tmp0<0: SB_d=S_d-|\sigma_d|$$

$$tmp0 \geq 0: SB_e=S_e+|\sigma_e|, tmp0<0: SB_e=S_e-|\sigma_e|$$

$$tmp0 \geq 0: SB_f=S_f-|\sigma_f|, tmp0<0: SB_f=S_f+|\sigma_f|$$

$$tmp0 \geq 0: SB_g=S_g-|\sigma_g|, tmp0<0: SB_g=S_g+|\sigma_g|$$

$$tmp0 \geq 0: SB_h=S_h-|\sigma_h|, tmp0<0: SB_h=S_h+|\sigma_h|$$

$$tmp0 \geq 0: SB_i=S_i-|\sigma_i|, tmp0<0: SB_i=S_i+|\sigma_i|$$

In next step ST47 a signal indicating a result of the block-distortion reducing process is transmitted.

If a determination is made in step ST45b that no block distortion takes place, the operation proceeds to step ST48 so that an original signal in the correction range is as it is transmitted.

An example of the edge detecting process in step ST43 will now be described with reference to FIG. 11.

Figures 11, 12:
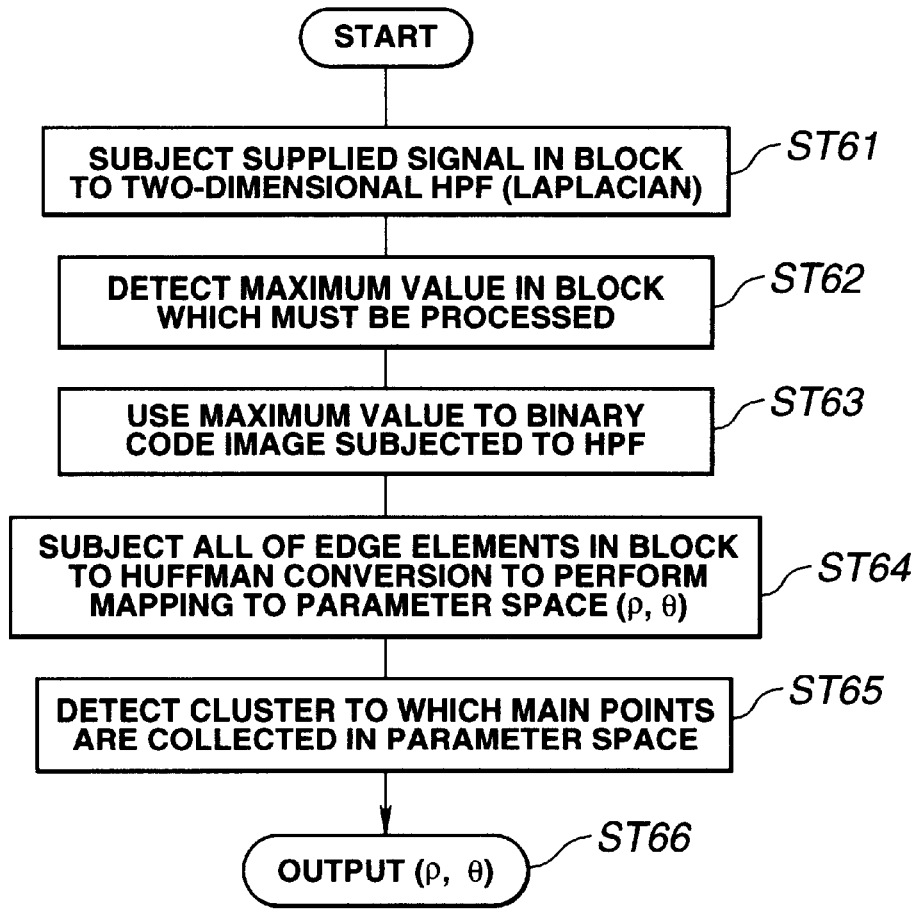
FIG. 11 is a flow chart of the operation of an edge extracting process.
FIG. 12 is a diagram showing an example of coefficients of Laplacian filter.

In first step ST61 shown in FIG. 11, edge elements are extracted by causing an input signal in the edge extraction block to pass through a 2D HPF (High-Pass Filter), for example, the Laplacian filter.

As the 2D Laplacian filter, for example, the coefficients shown in FIG. 12 may be employed. The present invention is not limited to those shown in FIG. 12. A variety of modifications may be employed, for example, Sobel operator, Prewitt operator, Kirsch operator and Robinson Operator.

Then, the operation proceeds to step ST62 so that maximum value Max of the signals in the block subjected to the HPF is detected. In next step ST63 a threshold value Thresh (for example, Thresh=Max/2) on the basis of the maximum value Max is used to perform binary coding so that edge elements are extracted. That is, the binary coding is a process which is performed such that when the input signal Sin>Thresh, output is Sout=1. When Sin$\leq$Thresh, Sout=0.

Then, the operation proceeds to step ST64 so that the extracted edge elements are Huffinan transformed so as to be mapped to parameter space ($\rho$, $\theta$). The Huffinan transformation is performed such that edge elements (x, y) in the block are mapped to the parameter space ($\rho$, $\theta$) in accordance with the following equation:

$$x \cos \theta + y \sin \theta = \rho$$

In next step ST65 ($\rho 0$, $\theta 0$) to which a multiplicity of points are collected in the parameter space is detected. A straight line which pass through ($\rho 0$, $\theta 0$) is a straight edge detected in the edge extraction block. In step ST66 an output of the parameter ($\rho$, $\theta$) is produced.

An example of the operation for detecting motion in step ST44 shown in FIG. 10 will now be described with reference to FIG. 13.

Figure 13:
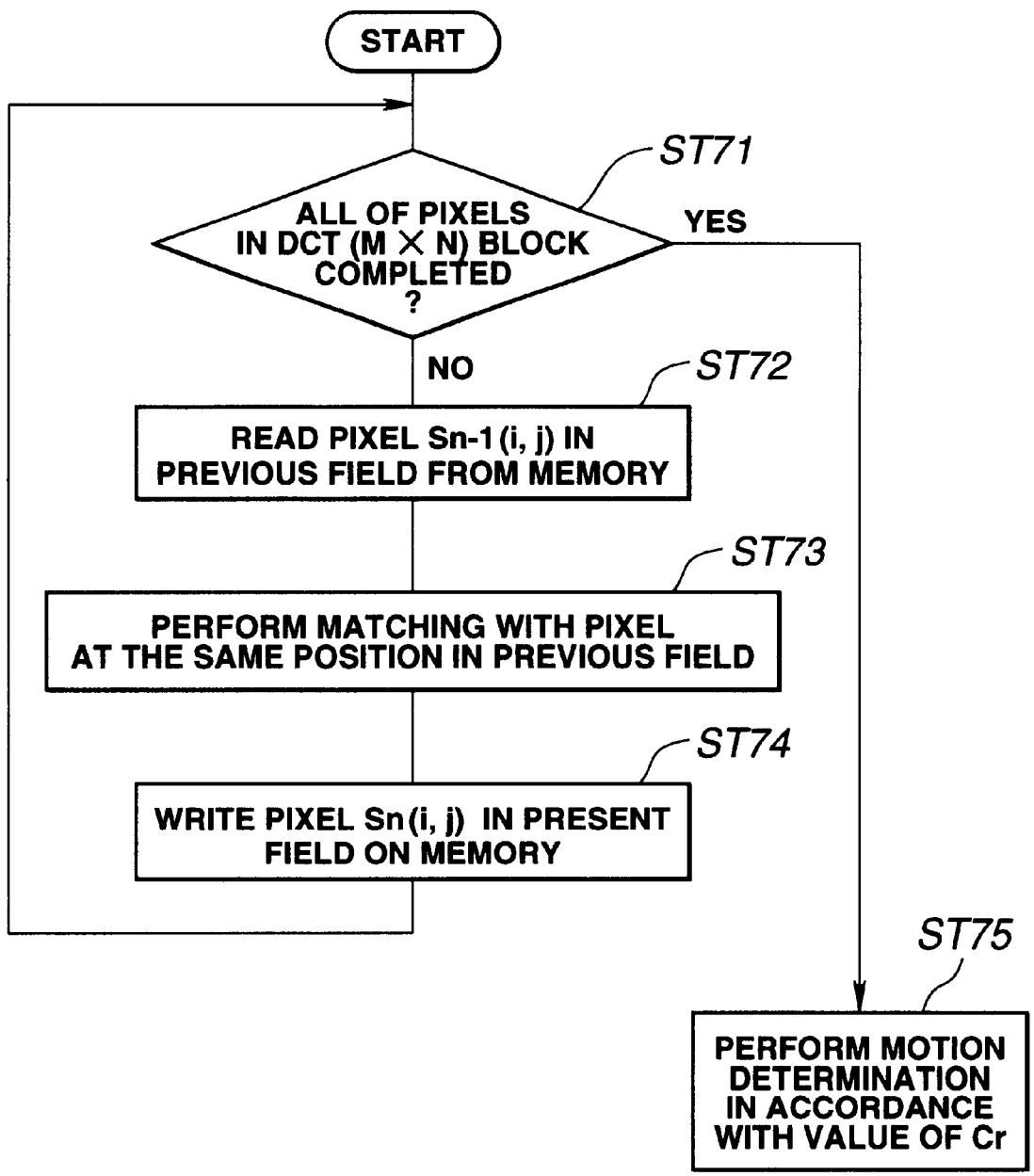
FIG. 13 is a flow chart of the operation of a motion detecting process.

The motion detecting process shown in FIG. 13 is performed such that the left and right DCT blocks 51L and 51R across the block boundary in the correction processing block shown in FIG. 7 are subjected to pattern matching.

The pattern matching process is performed such that pixels at the same positions as those of all of pixels in the DCT block and included in a previous field are read from the memory (step ST72). Then, a process expressed by a calculation equation (1) is performed (step ST73). Then, pixels in the present field are written on the memory (step ST74):

$$Cr = \sum_{i=0}^{j<BLK\_H} \sum_{j=0}^{j<BLK\_V} |S_n(i,j) - S_{n-1}(i,j)| \quad (1)$$

In equation (1), Sn (i,j) indicates brightness signals of the pixels at the positions (i,j) in n field and BLK_H and BLK_V indicate sizes of DCT blocks in the horizontal and vertical directions, respectively.

Whether or not the processes in steps ST72 to ST74 have been completed for all of the pixels in DCT (M X N) blocks is determined in the first step ST71. When an affirmative determination is made (when the processes have been completed), the operation proceeds to step ST75 so that the motion determination is performed in accordance with the value of Cr obtained in accordance with equation (1).

The motion determination in step ST75 may be performed such that parameter threshold values mov_thL and mov_thH (where mov_thL<mov_thH) are set for the value of Cr and determination is performed as follows:

If Cr<mov_thL, then motion is small.

If mov_thL≦Cr<mov_thH, then motion is intermediate.

If mov_thH≦Cr, then motion is large.

Although the example shown in FIG. 13 is structured such that pattern matching is performed for all of pixels in the DCT block, the present invention is not limited to the foregoing example. For example, a modification may be employed in which an LPF is used to thin two or four pixels. Then, the thinned pixels are subjected to pattern matching.

Although the example shown in FIG. 13 is structured such that pattern matching for DCT blocks at the same position is performed as the means for obtaining the degree of the motion, the present invention is not limited to the foregoing example. For example, a modification may be employed in which pattern matching C (k) of all of trial vectors in the motion compensation range are subjected to comparisons. Thus, a trial vector which give a minimum C (k) is made to be the motion vector so as to detect whether or not motion exist. Another modification may be employed in which a typical point matching is performed.

An example of the block-distortion determining operation in steps ST45a and ST46b shown in FIG. 10 will now be described with reference to FIG. 14.

Figure 14:
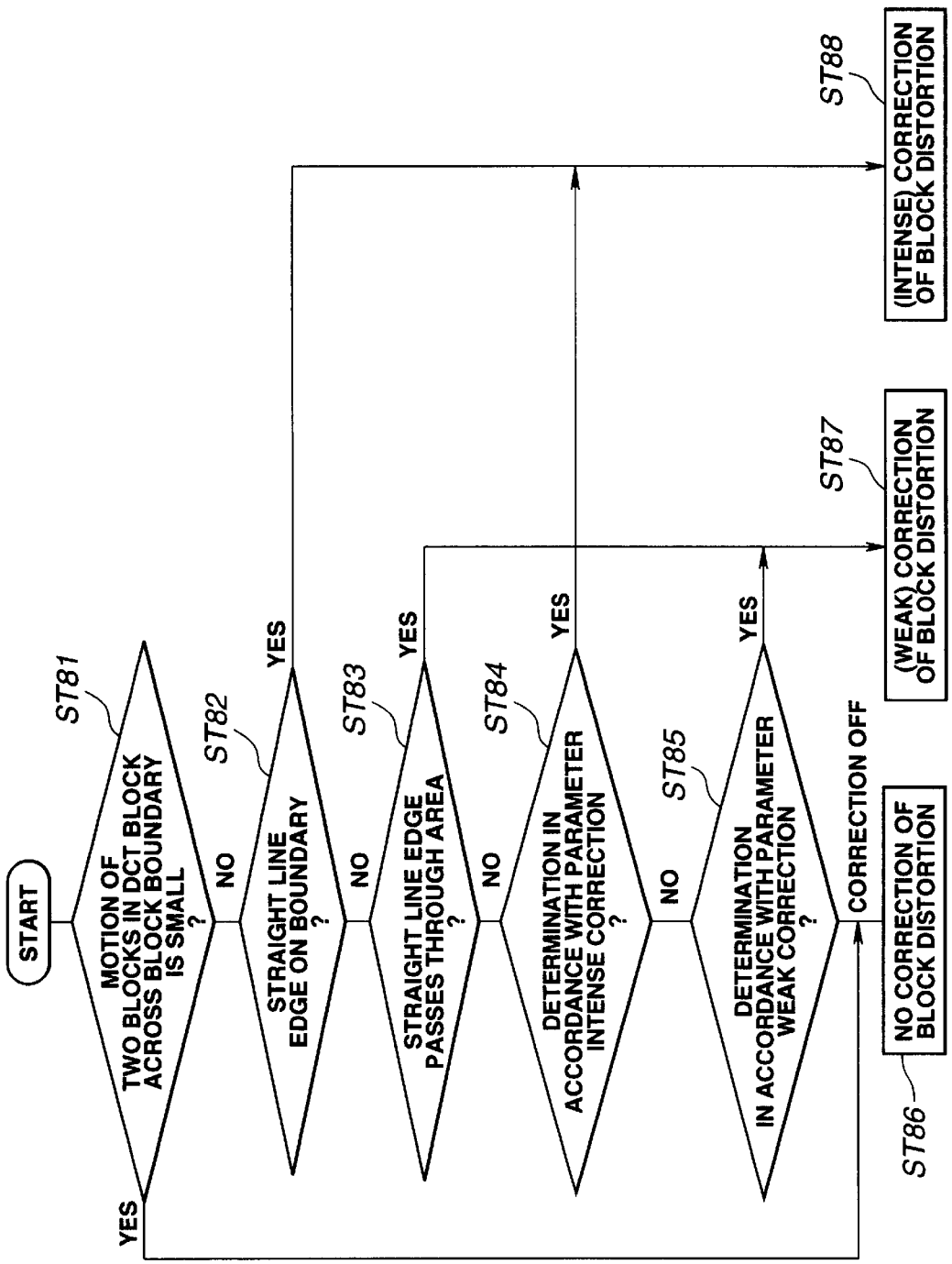
FIG. 14 is a flow chart showing an example of the operation of a block distortion determining process.

In the example shown in FIG. 14, the parameter determination and the determination on the basis of the motion detection are combined with each other.

The above-mentioned pattern matching process for the left and right DCT blocks 51L and 51R across the block boundary of the correction processing block shown in FIG. 7 is performed to examine the degree of motion. In step ST81 whether or not the detected motion is small is determined. If a determination is made that motions in both of the DCT blocks 51L and 51R are small, a determination is made that no quantization error exist. The operation proceeds to step ST86 so that no block distortion correction is not performed and the process is completed.

If a negative determination is made in step ST81 that the motion is not small, the operation proceeds to step ST82 so that whether or not a straight line edge exists on the block boundary is determined. At this time ρ0=edge extract block size/2 and θ0=π/2. If a determination is made in step ST82 that the straight line edge exists on the boundary, a determination is made that intense block distortion exists. Then, the operation proceeds to step ST88 so that the block distortion (intense) is corrected.

If a negative determination is made in step ST82, the operation proceeds to step ST83 so that a determination is made whether or not a straight line edge passes through an adjacent region (area) at the boundary between the right and left DCT blocks 51R and 51L shown in FIG. 6. If the straight line edge passes the area, a determination is made that weak block distortion exist. Thus, the operation proceeds to step ST87 so that the block distortion (weak) is corrected.

If a negative determination is made in step ST83, the block distortion is determined by using the parameter so as to determine whether correction is intense (step ST84) or correction is weak (step ST85). If a determination is made that the correction is intense, the operation proceeds to step ST88. If a determination is made that the correction is weak, the operation proceeds to step ST87. In the other cases, correction is not performed, and then the operation proceeds to step ST86.

An example of the determination of the block distortion will now be described. In accordance with the foregoing parameters |tmp0|, |tmp| and |diff|, the following conditional determination is performed so as to determine whether or not block distortion exists. The determination conditions include three conditions below:

(1) Whether or not a stepped portion is excessive as compared with the surrounding portions.

: boundary difference |tmp0|>activity |tmp|

(2) Whether or not the stepped portion is caused from a quantization error of a DC components and low-frequency components, that is, whether or not the stepped portion is caused from block distortion.

: boundary difference |tmp0|<threshold value div_th where the threshold value div_th is a fixed value in the second embodiment. However, a value proportional to a maximum value of the quantization step size of each block may be employed.

(3) Whether or not stepped portions larger than a stepped portion at the boundary exist on the two sides of the boundary, that is, whether or not edges exist on the two sides of the boundary.

: adjacent difference |diff3|≦boundary difference |tmp0| moreover, adjacent difference |diff4|<boundary difference |tmp0|.

When all of the three determination conditions are satisfied, a determination is made that block distortion exists. The intensity of the correction is determined in accordance with whether or not the boundary difference |tmp0| is smaller than the parameter threshold value corr_th as follows:

If |tmp0|<corr_th, then intense correction is performed.

If |tmp0|≧corr_th, then weak correction is performed.

where corr_th<div_th.

It is preferable that values of the threshold value div_th and corr_th are adaptively changed in accordance with the degree of the motion obtained in the above-mentioned motion detecting process. For example, the following relationships may be employed:

If motion is large, then div_th=div_th (constant)
    corr_th=corr_th (constant)

If motion is intermediate, then div_th=div_th/2 corr_th=corr_th/2

Note that the degrees of the motion in the motion detecting process are not limited to the three steps consisting of large, intermediate and small. Also the threshold values div_th and corr_th are not limited to the two steps consisting of large and intermediate. A finer steps may block employed.

As the method of the edge extracting process described with reference to FIG. 11, the following simple method may be employed in place of the Huffman transformation.

Figure 15:
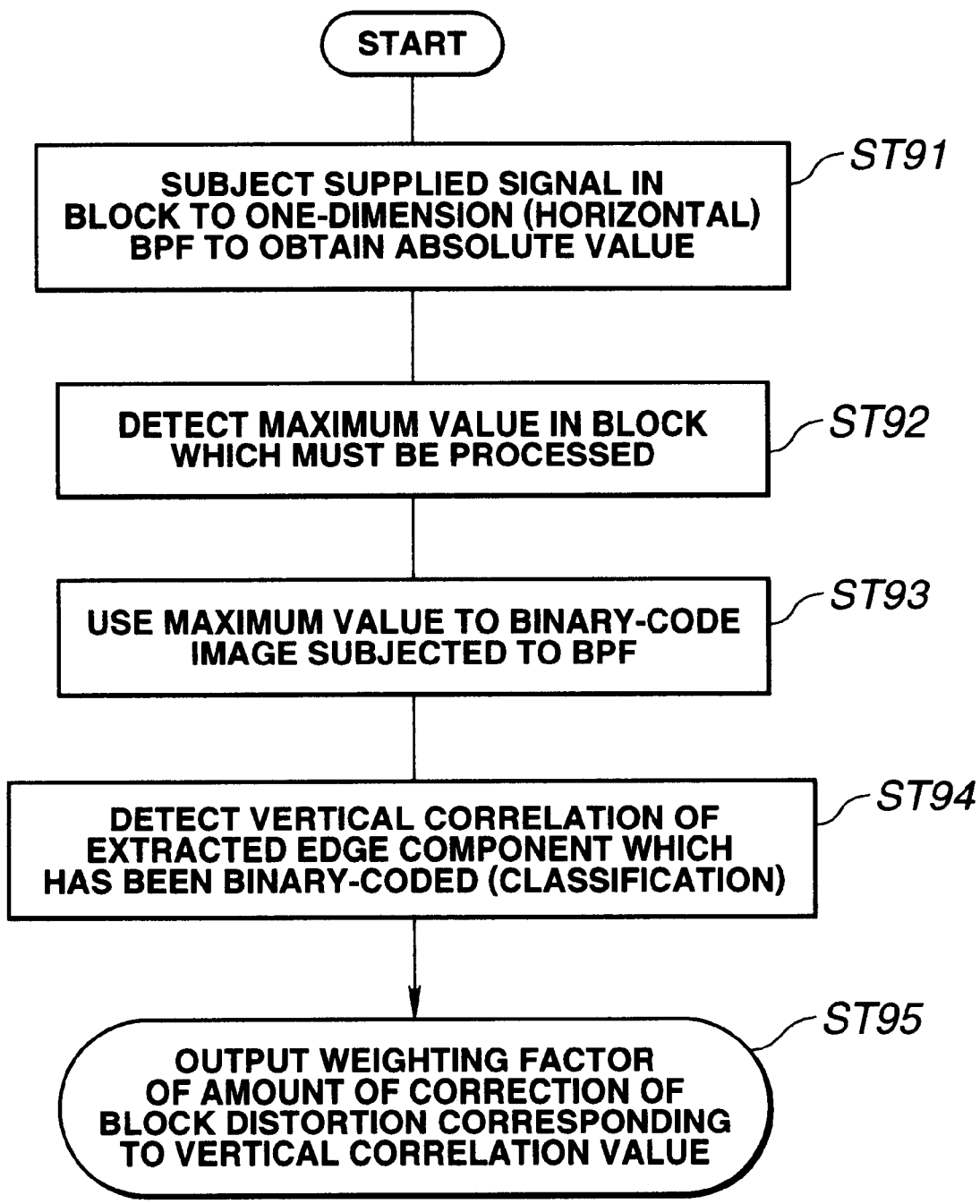
FIG. 15 is a flow chart of an example of the operation for extracting an edge by one-dimensional secondary differentiation.

A flow chart for describing the simple operation for extracting edges is shown in FIG. 15. FIG. 16 is a block diagram showing the schematic structure of a block-distortion reducing apparatus for use in the foregoing edge extracting process.

In the foregoing structure, edge extraction is performed by one dimensional (horizontal directional) secondary differentiation (BPF: Band Pass Filter) in step ST91 shown in FIG. 15. Transmission function H (z) of the secondary differentiation characteristic is exemplified by:

$$H(z)=(-1+2z^{-1}-z^{-2})/4$$

The absolute value of the secondary differential signal is calculated. Then, in step ST92 a maximum value in the processing block is detected. The maximum value is used in next step ST93 such that a BPF-processed image is binary-coded so that edges are detected. The threshold value for use in the binary-coding process may be, for example, ½ of a maximum value obtained by the secondary differentiation and the absolute-value process in the block.

An edge extracting portion 17' shown in FIG. 16 secondary-differentiates the supplied brightness signal from the terminal 12 by a BPF 34' as described above. Then, an absolute-value calculating circuit 38 calculates the absolute value, and a maximum value detecting circuit 35 decodes the maximum value. The threshold value communicated from the maximum value detecting circuit 35 is communicated to a binary-coding circuit 36 so that the signal supplied from the absolute-value calculating circuit 38 is binary-coded. An output of the binary-coding circuit 36 is supplied to a vertical correlation detecting portion 39.

The other structures and operations shown in FIG. 16 are similar to those of the structure shown in FIG. 8. The similar portions are given the same reference numerals and the similar portions are omitted from illustration. The vertical correlation detecting portion 39 performs a similar operation to that performed by the vertical correlation detecting circuit 5 according to the first embodiment shown in FIG. 1.

Although this structure is arranged such that the classes and the correction steps are made to be four classes and three steps respectively, the present invention is not limited to the foregoing structure. The weighting factor Kc of the amount of correction which is calculated by detecting the vertical correlation may be obtained from, for example, the following equation:

$$Kc=Eb/(Ea+Eb+Ec)$$

Moreover, the class obtained by the vertical correlation detecting portion 39 may be used to control the value of div_th which is the threshold value for use in the detection which is performed by the block-distortion determining portion. Since there is a great possibility when the vertical correlation is low, the threshold value div_th is enlarged so that control is performed in a direction in which detection cannot easily be performed.

In the present invention, the edge extracting portion, the correction-signal calculating portion and the block-distortion-determining-parameter calculating portion are arranged to be performed in accordance with the above-mentioned algorithms. However, the present invention is not limited to the foregoing algorithms. A variety of modifications may be employed, for example, an LPF may be employed as the correction-signal calculating portion. A variety of edge extracting methods, for example, an edge extracting method arranged to trace edges, may be employed. A variety of parameters may be employed in the block-distortion determining portion.

The foregoing embodiment has the structure that the block distortion correction is performed in the horizontal direction of the brightness signal. The present invention is not limited to the foregoing method. A variety of modifications may be employed, for example, the block-distortion correction is performed in the vertical direction or the chroma signal is corrected.

An example of a process will now be described, in which the determination which is performed by the block-distortion determining circuit 6 whether or not block distortion exists, is performed such that determining conditions are adaptively added to determine the block distortion as well as the determining conditions employed in the first and second embodiments. In the following description, the operation which is performed by the block-distortion determining circuit 6 according to the first embodiment will now be described.

A process which is performed by the block-distortion determining circuit 6 when information has been supplied from the parameter calculating circuit 4, the information indicating a fact that all of diff0 to diff7 have negative values and only tmp0 has a positive value or all of diff0 to diff7 have positive values and only tmp0 has a negative value. Note that FIG. 17 has the axis of ordinate which stands for levels of brightness signals of pixels a to j arranged in a line in a direction perpendicular to the block boundary. White circles indicate values of the brightness signals before the correction, while black circles indicate values of the brightness signals after the correction.

When the pixels a to e are monotonously decreased and the brightness is raised at only the block boundary and the brightness of each of the pixels f to j is monotonously decreased, a determination is made that monotonous decrease takes place also at the block boundary before the coding or decoding process. Then, the correction is performed.

That is, when a parameter indicating the foregoing image data has been supplied from the parameter calculating circuit 4 to the block-distortion determining circuit 6, first to third determining conditions below are added to the determining conditions according to the first and second embodiments:

$$\text{diff0 to diff7}>0 \text{ or diff0 to diff7}<0 \quad (1)$$

$$\text{tmp0}\times(\text{diff0}) \text{ to diff7})<0 \quad (2)$$

$$Kp \geq \text{diff\_th} \quad (3)$$

Thus, the block distortion is determined. That is, in accordance with the first determining condition, whether change in the brightness in the correction range except for the brightness is monotonous decrease or monotonous increase is determined. In accordance with the second determination condition, a determination is made that change in the brightness at the block boundary is inverse to change in another brightness in the correction range. In accordance with the third determination condition, a determination is made that the parameter Kp indicating the encoding degree of difficulty is not smaller than the parameter threshold value diff_th.

When the foregoing first to third determination conditions are satisfied, the block-distortion determining circuit 6 produces a flag indicating that image data before encoding or decoding is performed is image data which is monotonously decreased or monotonously increased so as to communicate the flag to the block-distortion correction circuit 7.

In accordance with the flag communicated from the block-distortion determining circuit 6, the block-distortion correction circuit 7 calculates correction value $\sigma 0$ as follows. The intensity of the correction is determined by the block-distortion correction circuit 7 in accordance with whether or not the block difference |tmp0| is smaller than the parameter threshold value corr_th.

When the block boundary difference |tmp0|<corr_th, correction value $\sigma 0 = (|tmp0|+|step|)/2$ so that the correction is intensified.

When |tmp0|≧corr_th, correction value $\sigma 0 = (|tmp0|+|step|)/4$ so that the correction is weakened.

Figure 18:
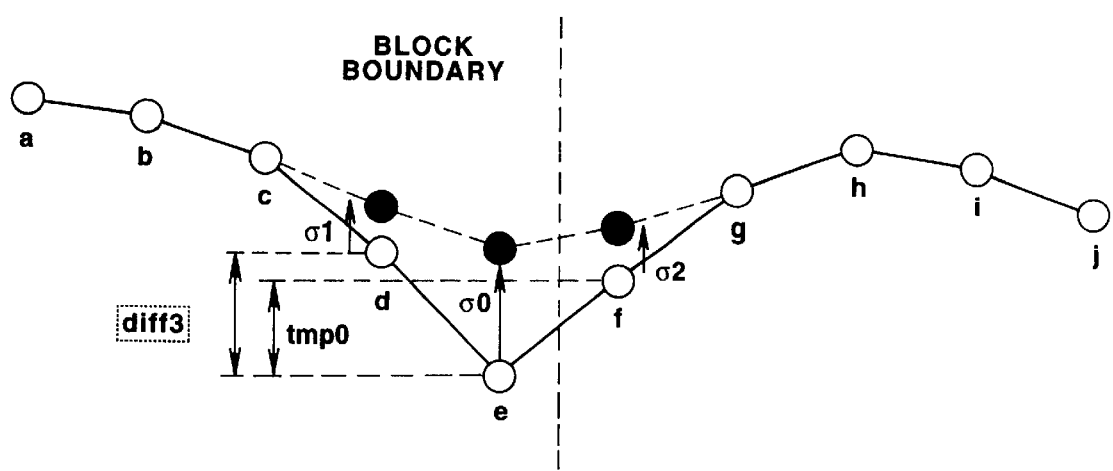
FIG. 18 is a diagram showing a block distortion reducing process to which an edge formed in a region except for the block boundary is subjected.

When |diff3| has a value larger than that of |tmp0| at the block boundary as shown in FIG. 18, the determination conditions employed in the first and second embodiments does not satisfy the condition under which block distortion can be detected. Therefore, if block distortion is visually recognized and the block distortion cannot be recognized, the block-distortion determining circuit 6 adds the first to third determination conditions to the determination conditions employed in the first and second embodiments:

block boundary difference |tmp0|≧activity |tmp|     (1)

block boundary difference |tmp0|<det_th     (2)

diff3×tmp0<0, diff4×tmp0 ≧0, diff2×diff3 ≧0     (3)

Thus, the block-distortion determining circuit 6 determines the block distortion. That is, the first determination condition is used to determine whether or not a stepped portion projecting to the block boundary exists. The second determination condition is used to determine whether or not an edge exists at the block boundary. The third determination condition is used to determine whether or not the pixel adjacent to the block boundary has an edge. That is, the third determination condition is used to determine a fact that the change in the brightness between pixels d and e and the change in the brightness at the block boundary are opposite to each other. Moreover, a fact is determined that the change in the brightness between pixels f to g and the change in the brightness at the block boundary are the same. Moreover, a fact is determined that the change in the brightness between pixels c and d and the change in the brightness between pixels d and e are the same. Inversely to the process shown in FIG. 18, the third determination condition is used to determine whether or not an edge exists between pixels f and g as follows:

diff4×tmp0<0, diff3×tmp0≧0, diff4×diff5≧0

When the flag has been communicated to the block-distortion correction circuit 7 in accordance with the above-mentioned determination condition, the block-distortion correction circuit 7 determines the intensity of the coefficient in accordance with whether or not the boundary difference |tmp0| is smaller than the parameter threshold value corr_th.

When block boundary difference |tmp0|≧corr_th, correction value $\sigma 0 = (|tmp0|+|diff3|)/4$ so that the correction is weakened.

When |tmp0|<corr_th, correction value $\sigma 0 = (|tmp0|+|diff3|)/2$ so that the correction is intensified.

Correction values $\sigma 1$ and $\sigma 2$ are made to be as follows:

correction value $\sigma 1 = diff2/2$ correction value $\sigma 2 = diff4/2$

Inversely to the process shown in FIG. 18, if an edge exists between pixels f and g, when block boundary difference |tmp0|≧corr_th, the correction value $\sigma 0 = (|tmp0|+|diff4|)/4$ so that the correction is weakened.

When |tmp0|<corr_th, correction value $\sigma 0 = (|tmp0|+|diff4|)/2$ so that the correction is intensified.

Correction values $\sigma 1$ and $\sigma 2$ are made to be as follows:

correction value $\sigma 1 = diff3/2$ correction value $\sigma 2 = diff5/2$

The block-distortion determining circuit 6 changes the determination conditions as described above. Thus, even if recognition is made that an edge exists on a pixel adjacent to the block boundary, block distortion can be detected.

Figure 19:
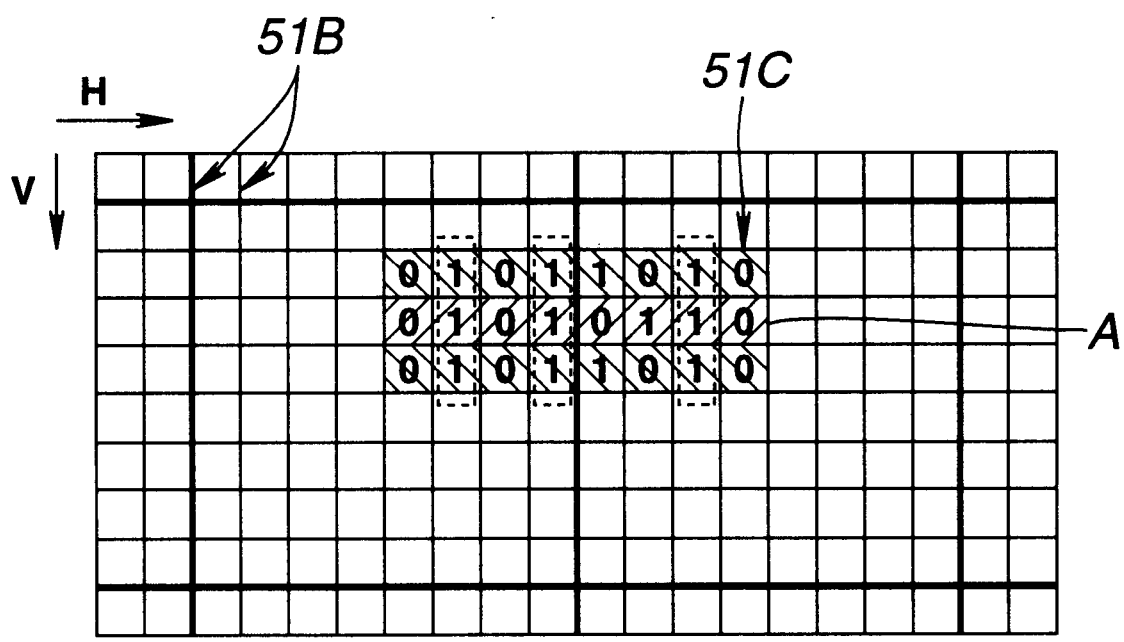
FIG. 19 is a diagram showing a block-distortion reducing process which is performed when pixels indicating an edge which is detected as block distortion exist in parallel with the block boundary.

Even if a pixel indicating an edge which can be detected as block distortion exists in parallel to the block boundary as shown in FIG. 19, the vertical correlation detecting circuit 5 may be controlled such that the vertical correlation detecting circuit 5 does not perform correction when the edge is larger than the threshold value. Note that the structure shown in FIG. 19 is arranged such that a pixel which can be recognized by the vertical correlation detecting circuit 5 is expressed as 1. On the other hand, a pixel which cannot be recognized as an edge is expressed as 0. That is, as shown in FIG. 19, line A which is being subject to the block distortion correction and the position of an edge of a line adjacent to the line A in the vertical direction V are detected in the vertical correlation detection range. Then, portions in which edges exist at the same positions on three lines in the vertical direction are counted. At this time, the number of pixels which are detected as edges is made to be num_edge and a threshold value for use to determine whether or not the correction is performed is edge_th. Then, the block-distortion determining circuit 6 produces a flag indicating a fact that no correction is performed when the following condition is satisfied:

num_edge>edge_th.

Then, the block-distortion determining circuit 6 produces an output of the flag to the block-distortion correction circuit 7. As described above, the vertical correlation detecting circuit 5 detects the correlation in the vertical direction. Then, the block-distortion determining circuit 6 changes the determination condition. Thus, incorrect detection can be reduced in which a picture having a fine stripe pattern existing in the vertical direction is incorrectly detected as block distortion.

Figure 20:
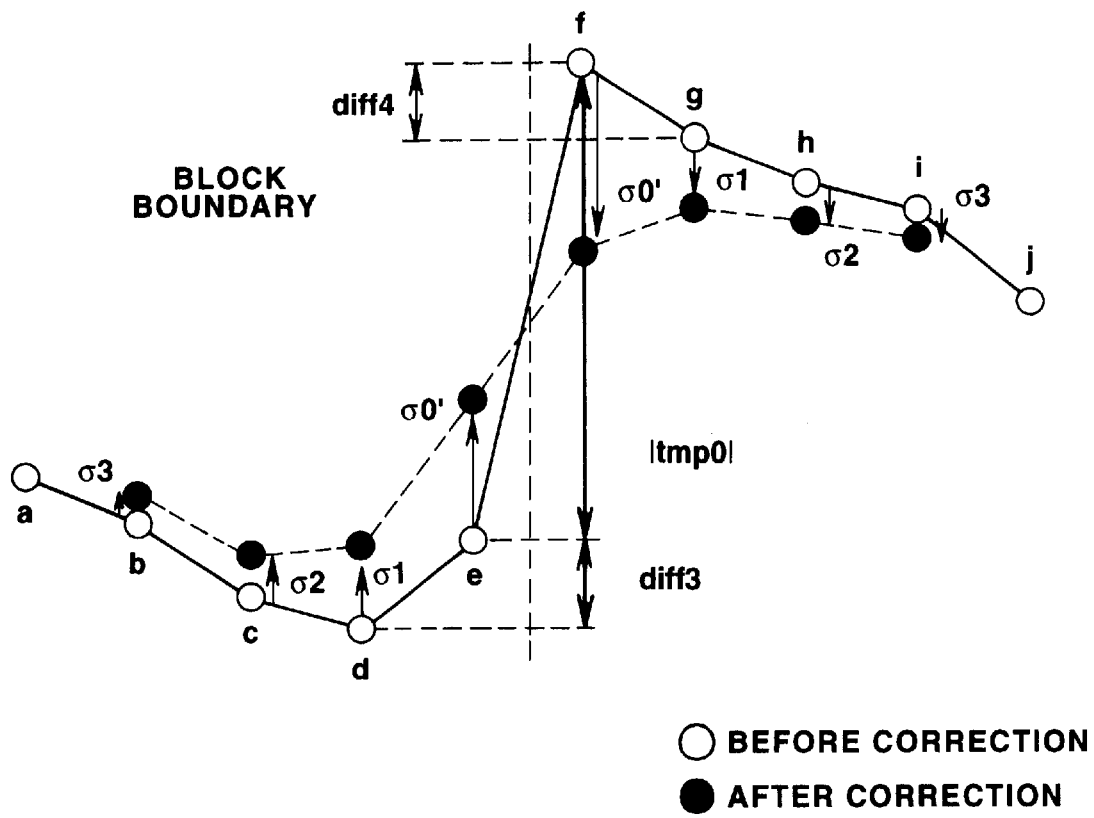
FIG. 20 is a diagram showing a correction process which is performed for the purpose of reducing an edge which is newly formed after the correction.

To reduce forming of a new edge as a result of the correction of the block distortion by the process according to the first and second embodiments, the block-distortion determining circuit 6 corrects the block distortion as shown in FIG. 20 such that the first to third determination conditions below are added so as to determine the block distortion:

|step|<$\sigma 0$×corr_ratio     (1)

$\sigma 0$>|diff3| and $\sigma 0$>|diff4|     (2)

|tmp0|<corr_th     (3)

That is, the first determination condition is used to determine whether or not the step |step| after the correction is smaller than a parameter ratio (corr_ratio) as compared with the correction amount $\sigma 0$. The second determination condition is used to determine whether or not the correction amount $\sigma 0$ is larger than the steps (diff3 and diff4) on the two sides of the block boundary. The third determination condition is used to determine whether or not the step |step| at the block boundary is smaller than the threshold value corr_th for determining the correction amount. Note that the third determination condition is arranged such that the ratio of the step |step| after the correction and the correction amount satisfies 0<corr_ratio<1.

When the first to third determination conditions are satisfied, the block-distortion determining circuit 6 produces an output of a flag indicating the foregoing fact to the block-distortion correction circuit 7. The block-distortion correction circuit 7 makes correction value σ0' of pixels e and f as follows:

σ0'=σ0/2

Thus, the correction value σ0 calculated in the process employed in the first and second embodiment is corrected.

Moreover, correction values σ1, σ2 and σ3 of pixels around the pixels e and f are made to be as follows:

σ1=σ0'/2

σ2=σ0'/4

σ3=σ0'/8

Since the correction values are determined as described above, the corrected brightness is free from a stepped portion which is indicated with a black circle shown in FIG. 20 and which is newly recognized as block distortion.

As described above, the block-distortion determining circuit 6 adds the first to third determination conditions so as to identify the pattern of the brightness adjacent to the block boundary. Then, whether or not a new edge is generated if the correction is performed under the determination conditions employed in the first and second embodiments is predicted. Thus, the block-distortion determining circuit 6 is able to control the correction value. Therefore, addition of the first to third determination conditions as described above enables formation of a new edge after the correction has been performed to be reduced.

Figure 21:
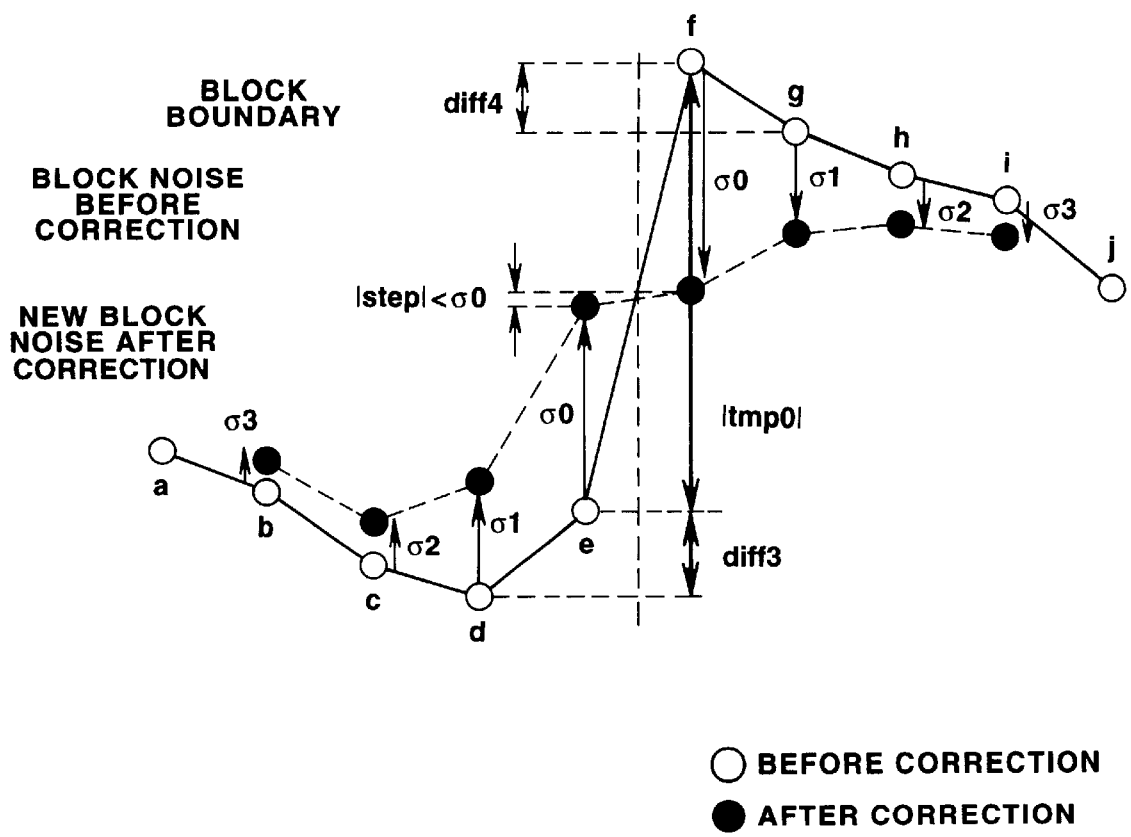
FIG. 21 is a diagram showing an example of the block distortion reducing method.

The block-distortion determining circuit 6 according to the first and second embodiments is able to reduce a fact that enlargement of diff3 after the correction causes a new edge to be detected as a result of the process as shown in FIG. 21.

Figure 22:
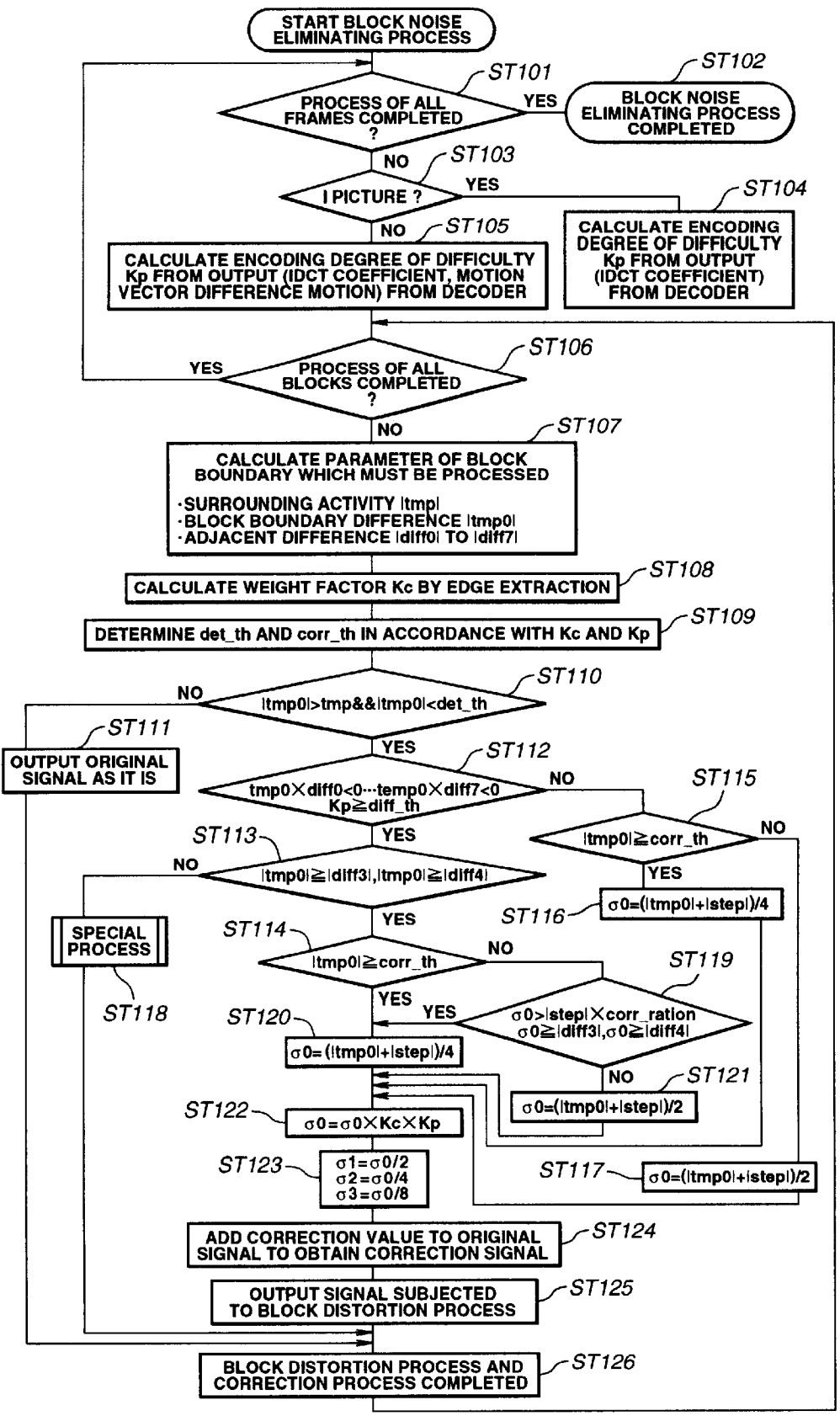
FIG. 22 is a flow chart of a block-distortion reducing process which is performed by a block-distortion reducing apparatus according to the first embodiment.

When the block-distortion reducing apparatus 1 structured as described above performs the block-distortion reducing process, the operation is performed in accordance with a flow chart shown in FIG. 22.

In accordance with the flow chart, in step ST101 whether or not all of frames constituting a dynamic image have been processed is determined. If a determination is made that all of the frames have been processed, the operation proceeds to step ST102 so that the process is ended. If a determination is made that the process has not been completed, the operation proceeds to step ST103.

In step ST103 whether or not the frame which must be subjected to the block-distortion reducing process is I-picture is determined. If a determination is made that the frame is the I-picture, the operation proceeds to step ST104. If a determination is made that the frame is not the I-picture, the operation proceeds to step ST105.

In step ST104 the encoding-degree-of-difficulty evaluation circuit 3 calculates, from the MPEG decoder 2, the parameter Kp indicating the encoding degree of difficulty by using the IDCT coefficient. In step ST105 the IDCT coefficient and the motion vector difference MV are used to calculate the parameter Kp indicating the encoding degree of difficulty. The parameter Kp is transmitted to the block-distortion determining circuit 6 and the block-distortion correction circuit 7. Then, the operation proceeds to step ST106.

In step ST106 whether or not all of DCT blocks in the frame which must be processed have been processed is determined. If a determination is made that the process has been completed, the operation returns to step ST101 so that a next frame is processed. If a determination is made that the process has not been completed, the operation proceeds to step ST107.

In step ST107 the parameter calculating circuit 4 calculates parameters including activity |tmp| adjacent to the block boundary, block boundary difference |tmp0| and adjacent differences |diff0| to |diff7| so as to transmit the parameters to the block-distortion determining circuit 6. Then, the operation proceeds to step ST108.

In step ST108 the vertical correlation detecting circuit 5 extracts edges so that weighting factor Kc is calculated. The weighting factor Kc is transmitted to the block-distortion determining circuit 6 and the block-distortion correction circuit 7. Then, the operation proceeds to step ST109.

In step ST109 the block-distortion determining circuit 6 uses vertical correlation value Kc supplied from the vertical correlation detecting circuit 5 and the parameter Kp indicating the encoding degree of difficulty and supplied from the encoding-degree-of-difficulty evaluation circuit 3 so as to determine threshold value det_th and corr_th.

In step ST110 the block-distortion determining circuit 6 employs the following determination conditions:

|tmp0|>|tmp| and |tmp0|<det_th

Thus, the block-distortion determining circuit 6 determines whether or not the stepped portion at the block boundary is an excessively projecting stepped portion as compared with adjacent pixels and whether or not the stepped portion is caused from a quantization error of DC components and low-frequency components, that is, whether or not the stepped portion is caused from block distortion. If the two determination conditions are not satisfied, the operation proceeds to step ST111 so that the block-distortion correction circuit 7 does not perform the correction operation. Thus, the original signal is as it is transmitted. If either of the two determination conditions is satisfied, a determination is made that block distortion exists. Thus, the operation proceeds to step ST112.

Figure 17:
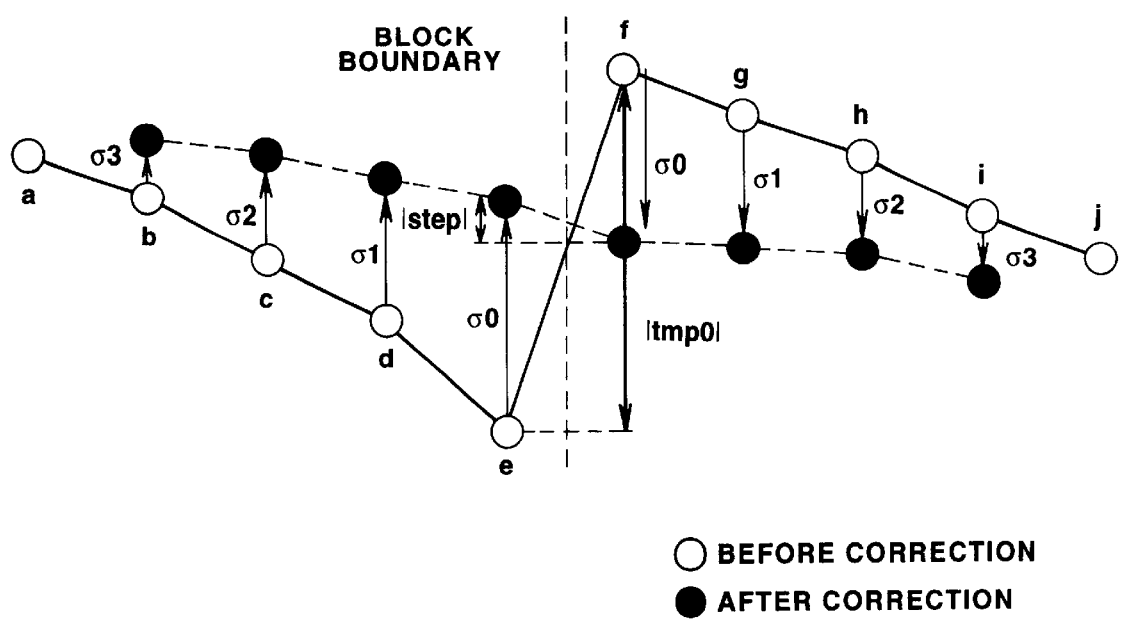
FIG. 17 is a diagram showing a block-distortion reducing process which is performed when the brightness of each pixel is monotonously decreased across a block boundary and the brightness is raised at only the block boundary.

In step ST112 the block-distortion determining circuit 6 determines whether or not image which must be processed satisfies the following determination conditions as described with reference to FIG. 17:

| | |
|---|---|
| diff0 to diff7>0 or diff0 to diff7<0 | (1) |
| tmp0×(diff0 to diff7)<0 | (2) |
| Kp≧diff_th | (3) |

If the foregoing determination conditions are satisfied, a determination is made that change in the brightness in the correction range except for the block boundary is monotonous decrease or monotonous increase. Thus, the operation proceeds to step ST115. If the foregoing determination conditions are not satisfied, the operation proceeds to step ST113.

In step ST115 when a flag indicating a result of the determination made in step ST112 has been communicated to the block-distortion correction circuit 7, the block-distortion correction circuit 7 determines whether or not |tmp0|>corr_th is satisfied. If the foregoing condition is satisfied, the operation proceeds to step ST116 so that the correction is made to be weak. If the foregoing condition is not satisfied, the operation proceeds to step ST117 so that the correction is intensified. Then, the operation proceeds to step ST122.

In step ST113 the block-distortion determining circuit 6 determines whether or not the determination conditions |tmp0|≧|diff3| and |tmp0|≧|diff4| are satisfied. Thus, the determination conditions when block distortion cannot be recognized under the conditions employed in the first and second embodiments are changed. If the foregoing conditions are satisfied, a determination is made that no edge exists except for the block boundary. Thus, the operation proceeds to step ST114. If the conditions are not satisfied, a determination is made that an edge exists in a portion except for the block boundary. Thus, the operation proceeds to step ST118 so that a special process to be described later is performed.

In step ST114 the block-distortion determining circuit 6 performs a process similar to the process which is performed in step ST115. If the condition is satisfied, the operation proceeds to step ST120. If the condition is not satisfied, the operation proceeds to step ST119.

In step ST119 the block-distortion determining circuit 6 performs the process described with reference to FIG. 20. That is, in step ST119 the first and second determination conditions are determined. Note that the third determination condition has been satisfied in step ST114. Since the above-mentioned determination conditions are employed, whether or not a new edge has been formed adjacent to the block boundary after the correction has been performed is determined. In step ST119, if the first and second determination conditions are satisfied, a determination is made that a new edge is formed after the correction is performed. Thus, the operation proceeds to step ST120 so that the correction is weakened. If the conditions are not satisfied, a determination is made that any new edge is formed after the correction has been performed. Thus, the operation proceeds to step ST121 so that the correction is intensified.

In step ST120 and step ST121 the block-distortion correction circuit 7 determines the intensity of the correction similarly to step ST116 and step ST117. Then, the operation proceeds to step ST122.

In step ST122 the block-distortion correction circuit 7 multiplies the correction value σ0 with the parameter Kp supplied from the encoding-degree-of-difficulty evaluation circuit 3 and indicating the encoding degree of difficulty and the weighting factor Kc supplied from the vertical correlation detecting circuit 5 and indicating the correlation. Then, the operation proceeds to step ST123.

In step ST123 the block-distortion correction circuit 7 determines a correction value for each pixel in the correction range. At this time, the block-distortion correction circuit 7 intensifies the correction in the vicinity of the block boundary. When correction values σ1, σ2 and σ3 for the pixels have been determined, the operation proceeds to step ST124.

In step ST124 the block-distortion correction circuit 7 adds the correction value determined in step ST123 to the original signal so that corrected image data is obtained. In step ST125 the block-distortion correction circuit 7 produces an output of image data, from which the block distortion has been reduced. In step ST126 the block-distortion reducing process and the correction process for one DCT block are completed. Then, the process is returned to step ST106. That is, according to the flow chart, each DCT block forming one frame is subjected to the processes in steps ST106 to ST125. Thus, the noise eliminating process and the correction process are performed. When all DCT blocks in one frame have been processed in step ST106, a next frame is processed. Since steps ST101 to ST106 are repeated, all of frame forming a dynamic image are processed.

Figure 23:
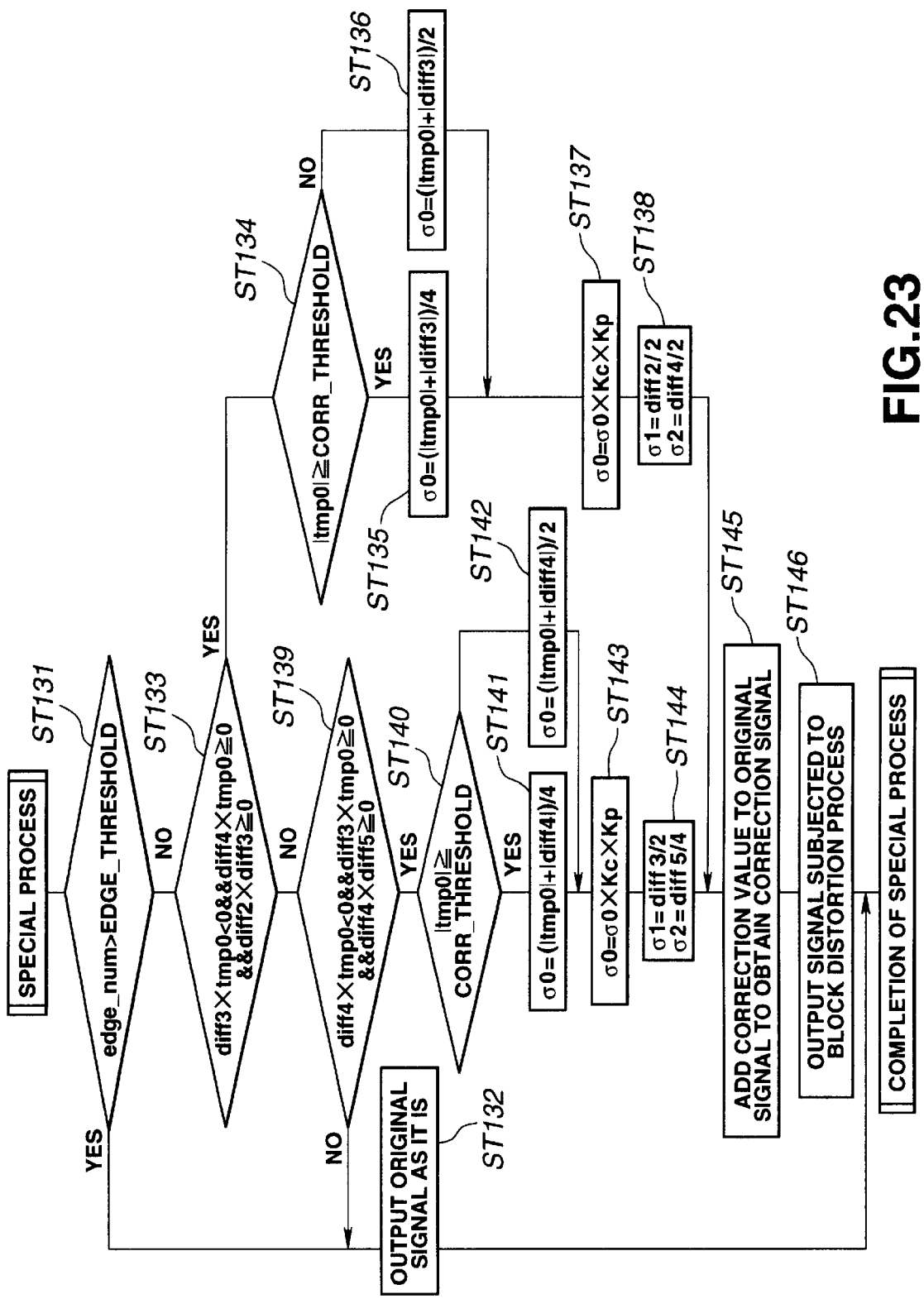
FIG. 23 is a flow chart of a special process during a block-distortion reducing process.

The special process in step ST118 will now be described with reference to a flow chart shown in FIG. 23.

In accordance with the flow chart, in step ST131 the vertical correlation detecting circuit 5 counts the number of edges, that is, num_edge, in the vertical direction V as described with reference to FIG. 19. The block-distortion determining circuit 6 determines whether or not the determination condition num_edge>edge_th is satisfied. If the foregoing condition is satisfied, the operation proceeds to step ST132 so that the noise eliminating process is not performed and the original signal is as it is transmitted. That is, a determination is made that the original signal is image data indicating a stripe pattern adjacent to the block boundary. If the condition is not satisfied, the operation proceeds to step ST133.

In step ST133 the block-distortion determining circuit 6 determines whether or not an edge existing in a portion except for the block boundary exists on the left side of the block boundary. That is, in step ST133 the block-distortion determining circuit 6 determines whether or not the following conditions is satisfied:

$$\text{diff3} \times \text{tmp0} < 0, \text{diff4} \times \text{tmp0} \geq 0, \text{diff2} \times \text{difF3} \geq 0$$

If the foregoing determination condition is satisfied, the operation proceeds to step ST134. If the condition is not satisfied, the operation proceeds to step ST139.

In step ST139 the block-distortion determining circuit 6 determines an edge existing in a portion except for the block boundary exists on the right side of the block boundary. That is, in step ST133 the block-distortion determining circuit 6 determines whether or not the following condition is satisfied:

$$\text{diff4} \times \text{tmp0} < 0, \text{diff3} \times \text{tmp0} \geq 0, \text{diff4} \times \text{diff5} \geq 0$$

If the foregoing condition is satisfied, the operation proceeds to step ST140. If the condition is not satisfied, a determination is made that no portion, which is determined as an edge, exists on the two sides of the block boundary. Thus, the operation proceeds to step ST132 so that the original signal is as it is transmitted.

In step ST134 the block-distortion correction circuit 7 determines whether or not |tmp0|>corr_th. If the foregoing condition is satisfied, the operation proceeds to step ST135 so that the correction is weakened. If the condition is not satisfied, the operation proceeds to step ST136 so that the correction is intensified. Then, the operation proceeds to step ST137 in either case.

In step ST137 the block-distortion correction circuit 7 multiplies the correction value σ0 with the parameter Kp supplied from the encoding-degree-of-difficulty evaluation circuit 3 and indicating the encoding degree of difficulty and the weighting factor Kc supplied from the vertical correlation detecting circuit 5 and indicating the correlation. Then, the operation proceeds to step ST138.

In step ST138 correction values σ1 and σ2 for the pixels adjacent to the two sides of the pixel which is corrected with the correction value σ0 are calculated in accordance with the following equation:

$$\sigma1 = \text{diff2}/2, \sigma2 = \text{diff4}/2$$

In steps ST140 to ST146 processes similar to those in steps ST134 to ST138 are performed. The difference lies in that in step ST141 and step ST142 the intensity of the correction is determined. Moreover, in step ST144 the adjacent difference which must be corrected with the correction value al is diff3. Moreover, the adjacent difference which must be corrected with the correction value σ2 is diff5.

In step ST145 a process similar to that in step ST124 is performed. In step ST146 a process similar to that in step ST125 is performed. Thus, the process is ended.

Although the operation of the block-distortion reducing apparatus described with reference to FIGS. 17 to 23 has been described about the block-distortion reducing apparatus 1 according to the first embodiment, the same arrangement may be applied to the block-distortion reducing circuit according to the second embodiment. In this case, the block-distortion reducing circuit according to the second embodiment is arranged such that the block-distortion determining portion 18 employs the above-mentioned determination conditions corresponding to pictures of image data. Thus, block distortion is determined to correspond to the picture, and then the correction-value calculating portion 32 performs correction.

A third embodiment of the present invention will now be described. When a dynamic image compressed by an image compressing apparatus arranged to perform a block process using 2D DCT is again compressed by the MPEG, a block distortion encoding apparatus according to this embodiment previously removes block noise peculiar to the foregoing compressing method and then perform the re-compressing operation so as to improve the encoding and compressing efficiency.

When a bit stream formed by encoding image data read from a recording medium, for example, an optical disk, is broadcast, a reading bit rate from the recording medium and broadcasting bit rate are generally different from each other. Therefore, the bit rate of the bit stream is converted. Specifically, an 8 Mbps bit stream is sometimes converted into 4 Mbps bit stream.

Hitherto, when the rate of a bit stream encoded by MPEG is converted after which re-encoding on the basis of the MPEG is performed, re-encoding has been performed as it is even if block noise is caused in the decoded image obtained by the MPEG decoding.

When a bit stream on the basis of a dynamic image encoding method for performing a recording process using DCT except for the MPEG is MPEG-encoded after a decoded image has temporarily been obtained by the foregoing encoding method so as to be converted into the MPEG bit stream, MPEG-encoding has been performed as it is even if block noise is made.

Therefore, when motion vector detection is performed for motion compensation when MPEG encoding is performed when MPEG re-encoding is performed of when the format is converted, the accuracy to detect the motion vector has deteriorated because of obstruction of block noise.

The position at which block noise is made depends on the block of the block. Therefore, when the same encoding method is employed to perform encoding for the purpose of performing re-encoding or format conversion, there arises a problem in that block noise is highlighted and made to be conspicuous on a reproduced image if the image on which block noise has been made is encoded without elimination of block noise.

Figure 24:
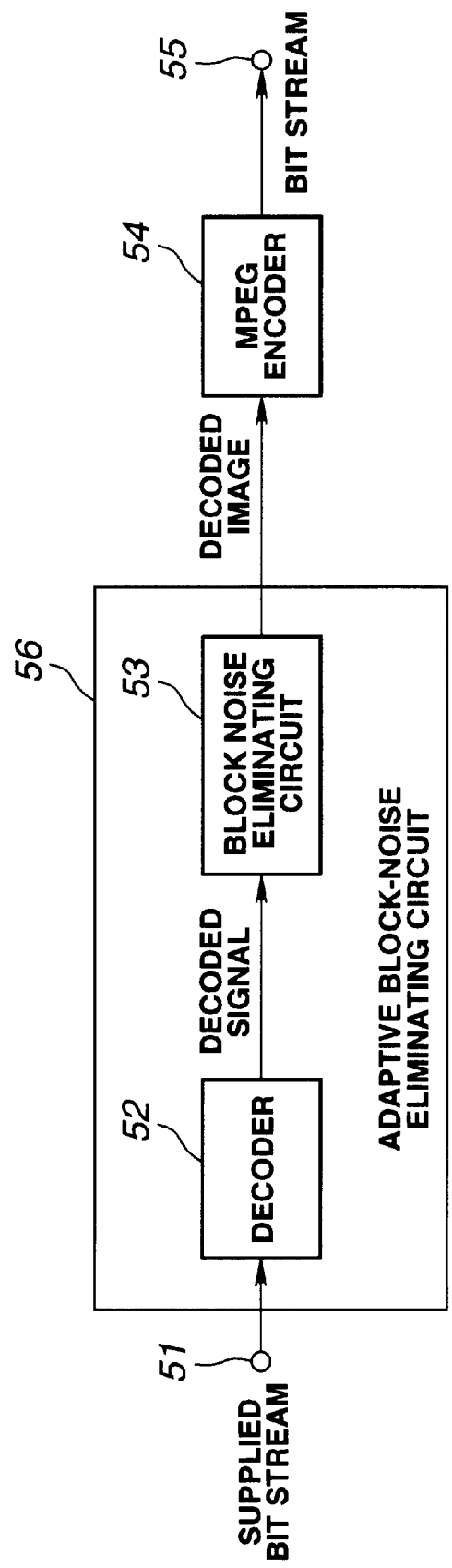
FIG. 24 is a block diagram showing a system for eliminating block noise before re-encoding is performed.

FIG. 24 is a block diagram showing an encoding apparatus according to a third embodiment and arranged to perform elimination of block noise before re-encoding is performed.

The encoding apparatus according to this embodiment incorporates, an input terminal 51; an adaptive block-noise eliminating circuit 56 for subjecting a supplied bit stream to adaptive block noise elimination; and an encoder 54 for encoding a decoded image transmitted from the adaptive block-noise eliminating circuit 56 into a bit stream in the form of the MPEG standard so as to produce an output of the decoded image to an output terminal 55.

The adaptive block-noise eliminating circuit 56 incorporates an edge extraction block 52 for decoding a supplied bit stream; and a block-noise eliminating circuit 53 for eliminating block noise from the decoded image.

The bit stream supplied through the input terminal 51 is decoded by the edge extraction block 52. The bit stream supplied through the input terminal 51 has been encoded by an encoding method for performing a block process using the two-dimensional DCT. Therefore, the foregoing bit stream can be decoded by the edge extraction block 52.

Block noise of the image decoded by the edge extraction block 52 is eliminated by the block-noise eliminating circuit 53. Elimination of block noise by the block-noise eliminating circuit 53 may be performed by, for example, the above-mentioned method. Since block noise of the input image which is supplied to the encoding apparatus has been removed from the decoded image which is supplied to the encoder 54, the encoding efficiency of the encoder 54 can be improved.

The encoded bit stream obtained by the encoder 54 is transmitted to the output terminal 55.

When the bit stream supplied through the input terminal 51 is a bit stream encoded by a hybrid compression method using motion compensation as well as the two-dimensional DCT like the MPEG using motion compensation DCT, a motion vector having a high correlation with generation of block noise and an encoding parameter, such as the count after the inverse DCT can be obtained from the input terminal 51. Therefore, use of the adaptive block-noise eliminating circuit 56 enables block noise to furthermore efficiently be eliminated. The adaptive block noise elimination has been described above.

Figure 25:
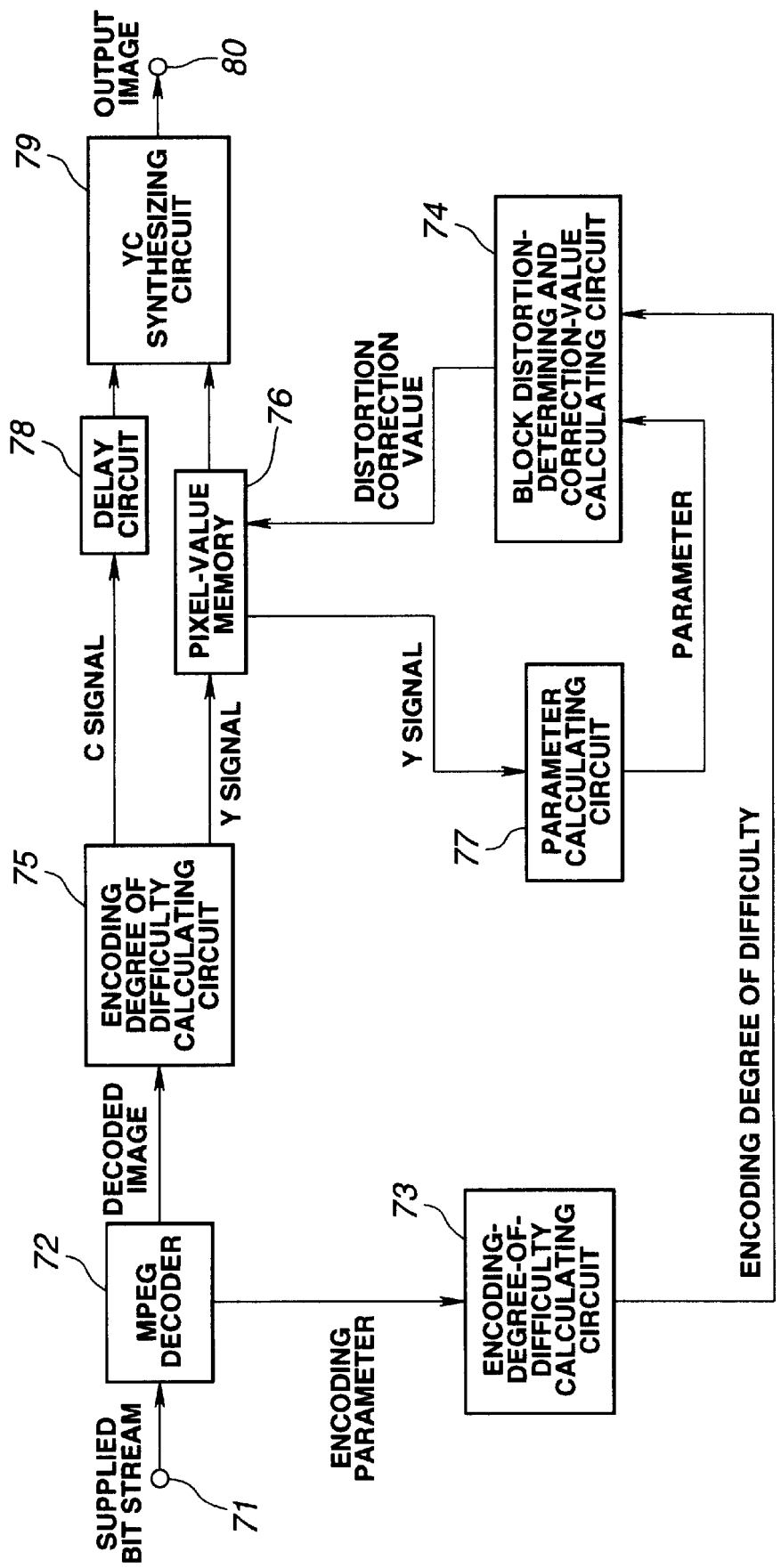
FIG. 25 is a block diagram showing an adaptive block noise eliminating method.

FIG. 25 is a block diagram of the adaptive block-noise eliminating circuit 56 for performing the adaptive block noise elimination.

The adaptive block-noise eliminating circuit 56 incorporates a MPEG decoder 72 for decoding a bit stream supplied through an input terminal 71 and encoded by the MPEG method; a YC separating circuit 75 for separating Y signals and C signals from the decoded image supplied from the MPEG decoder 72; a delay circuit 78 for delaying the C signal supplied from the YC separating circuit 75; a pixel-value memory 76 for memorizing the Y signals supplied from the YC separating circuit 75; and a YC synthesizing circuit 79 for synthesizing the C signal obtained through the delay circuit 78 and the Y signal obtained through the pixel-value memory 76 with each other so as to transmit an output image to an output terminal 80. The MPEG decoder 72 corresponds to the edge extraction block 52 shown in FIG. 24.

The adaptive block-noise eliminating circuit 56 incorporates an encoding-degree-of-difficulty calculating circuit 73 for calculating the encoding degree of difficulty in accordance with the encoding parameter supplied from the MPEG decoder 72; a parameter calculating circuit 77 for calculating a parameter for the Y signal supplied from the pixel-value memory 76; and a distortion-determining and correction-value calculating circuit 74 for determining block distortion in accordance with the encoding degree of difficulty communicated from the encoding-degree-of-difficulty calculating circuit 73 and the parameter supplied from the parameter calculating circuit 77 and calculating a correction value so as to supply the distortion correction value to the pixel-value memory 76.

The MPEG-encoded bit stream supplied to the input terminal 71 is decoded by the MPEG decoder 72.

The encoding parameter obtained when the decoding operation has been performed is supplied to the encoding-degree-of-difficulty calculating circuit 73 so that the encoding degree of difficulty is obtained. The encoding degree of difficulty is communicated to the distortion-determining and correction-value calculating circuit 74 so as to be used in the block distortion determination and calculation of the correction value.

The YC separating circuit 75 separates the supplied decoded image into Y signals and C signals. Pixel values in a range required to correct the Y signal are stored in the pixel-value memory 76.

The parameter calculating circuit 77 calls a required Y signal from the pixel-value memory 76 so as to calculate a parameter. The distortion-determining and correction-value calculating circuit 74 determines whether or not block distortion takes place in accordance with the supplied parameter and the encoding degree of difficulty. If block distortion takes place, the distortion-determining and correction-value calculating circuit 74 determines the pattern of the block distortion so as to calculate a correction value so as to supply it to the pixel-value memory 76. In the pixel-value memory 76, the correction value is added to the parameter Y signal so that a correction signal is obtained.

Figure 26:
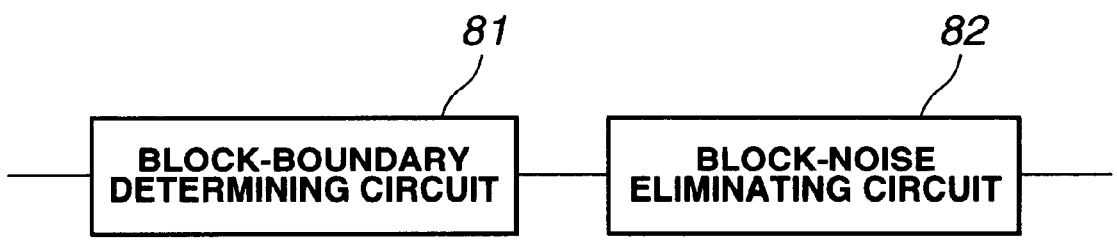
FIG. 26 is a block diagram of a structure for processing an analog signal which has been D/A converted after a decoding process has been performed.

In a case shown in FIG. 24, a digital signal is sometimes converted into an analog signal after the bit stream has been decoded. In the foregoing case, as shown in FIG. 26, the analog signal is encoded by the encoder 54 after block noise has been removed by the block-boundary determining circuit 81 and the block-noise eliminating circuit 82.

As described above, the third embodiment has a structure that block noise peculiar to the compression method is removed by a block noise eliminating filter when a dynamic image compressed by an image compressing method using the two-dimension DCT is temporarily decoded so as to be returned to an image and then re-compression is performed.

Since block noise is eliminated, the accuracy of the motion prediction can be improved. Thus, the encoding efficiency when the re-compression is performed can be improved.

Since block noise is previously removed, block noise of an image obtained by decoding a re-compressed image can be reduced.

When the pervious compression method is the hybrid compression method using the MC-DCT and vector information when MC is performed is used when the re-compression is performed, use of the adaptive block noise eliminating method using the motion vector information enables the efficiency in the block noise elimination to be improved.

As described above, when an image compressed by the dynamic-image compressing and encoding method using the two-dimensional DCT is temporarily decoded and then re-encoded, the encoding efficiency can be improved. Thus, generation of block noise can be reduced and thus visual image quality can be improved.

As can be understood from the description above, the method and apparatus for reducing block distortion and the encoding method and the encoding apparatus according to the present invention is able to reduce a problem caused from correction while block distortion is reduced in a state in which high-frequency components are not omitted and thus the resolution is maintained. Since the hardware structure can be simplified, the structure according to the present invention can be mounted on a variety of consumer appliances for performing a compressing process using block encoding, such as DCT encoding. That is, the present invention may be applied to, for example, a video CD player, a digital video disk player, a digital television receiver, and a television telephone and so forth. As a matter of course, the above-mentioned algorithm can be realized by means of software. Thus, reduction of block distortion and elimination of block distortion can easily be realized when a dynamic image is reproduced in a real time manner in, for example, Internet or multimedia. Since the structure of the present invention has three modes including intense/intermediate/weak, reduction of block distortion adaptable to a state of the image can be performed. Also the parameter for use in the block-distortion reducing process can be adjusted from outside, a precise adjustment is permitted as well as the three modes.

Moreover, the present invention is arranged to use effective information about the edge extraction and motion detection is able to reduce an incorrect determination which is caused from determination of block distortion.

Note that the present invention is not limited to the above-mentioned embodiments. Although the description has been made about the horizontal (H) direction, the present invention may be applied to a process in the vertical (V) direction. As a matter of course, the method of calculating the correction value and the filtering process are not limited to the above-mentioned descriptions.

What is claimed is:

1. A method of reducing block distortion such that block distortion caused when supplied image data is block-encoded is reduced, said method of reducing block distortion comprising:

an encoding-degree-of-difficulty detecting step for detecting a parameter indicating an encoding degree of difficulty from supplied image data;

a calculating step for calculating a parameter required to determine block distortion from supplied image data;

a determining step for determining block distortion in accordance with a result of detection of the parameter indicating the encoding degree of difficulty and a result of the calculation for obtaining the parameter;

a correction-value calculating step for calculating a correction value for reducing block distortion; and a step for subjecting supplied image data to a correction using a correction value corresponding to a result of the determination of block distortion so as to produce an output.

2. A method of reducing block distortion according to claim 1, wherein said encoding-degree-of-difficulty detection step is performed such that a process for calculating an amount of energy of high-frequency components is performed in such a way that high-frequency components of supplied image data are extracted so as to detect the parameter indicating the encoding degree of difficulty.

3. A method of reducing block distortion according to claim 1, wherein said encoding-degree-of-difficulty detection step is performed such that motion detection process is performed to detect the motion of supplied image data so as to detect the parameter indicating the encoding degree of difficulty.

4. A method of reducing block distortion according to claim 1, wherein said encoding-degree-of-difficulty detection step is performed such that motion detection process is performed to detect the motion of supplied image data and a process for calculating an amount of energy of high-frequency components is performed in such a way that high-frequency components of supplied image data are extracted so as to detect the parameter indicating the encoding degree of difficulty.

5. A method of reducing block distortion according to claim 1, further comprising a decoding step for subjecting a supplied bit stream to a decoding process for the purpose of obtaining supplied image data, wherein said decoding step is performed such that the supplied bit stream is subjected to a decoding process and a motion vector difference signal and an IDCT coefficient contained in the supplied bit stream are detected, and said encoding-degree-of-difficulty detection step is performed such that the motion vector difference signal and the IDCT coefficient detected in the decoding step are converted into the parameter indicating the encoding degree of difficulty.

6. A method of reducing block distortion according to claim 1, wherein said determining step is performed such that a plurality of intensities of block distortion are determined to cause correction to be performed with an amount of correction corresponding to the determined intensity.

7. A method of reducing block distortion according to claim 1, further comprising a correlation detecting step for detecting correlation of a boundary among blocks, wherein said determining step is performed such that block distortion is determined by using the correlation detected in said correlation detecting step, and said correction-value calculating step is performed such that the correlation detected in said correlation detecting step is used to calculate the correction value.

8. A method of reducing block distortion according to claim 2, wherein the extraction of high-frequency components is detection of edge components of supplied image data, and the process for calculating the energy amount of the high-frequency components is an edge extracting process.

9. A method of reducing block distortion according to claim 2, wherein said correction-value calculating step is performed such that the parameter detected in said encoding-degree-of-difficulty detecting step and on the basis of a result of the extraction of the high-frequency components performed in said process for calculating the energy amount of the high-frequency components is used to calculate the correction value.

10. A method of reducing block distortion according to claim 3, wherein said correction-value calculating step is performed such that the parameter detected in said encoding-degree-of-difficulty detecting step and on the basis of a result of the motion detection performed in said motion detecting process is used to calculate the correction value.

11. A method of reducing block distortion according to claim 4, wherein said correction-value calculating step is performed such that the parameter detected in said encoding-degree-of-difficulty detecting step and on the basis of a result of motion detection performed in said motion detecting process and a result of motion detection performed in said process for calculating the energy amount of the high-frequency component is used to calculate the correction value.

12. A method of reducing block distortion according to claim 5, wherein said determining step is performed such that a parameter on the basis of the motion vector difference signal and the IDCT coefficient detected in said decoding step is used to determine block distortion, and said correction-value calculating step is performed such that a parameter on the basis of the vector signal and the IDCT coefficient detected in said decoding step is used to calculate the correction value.

13. A method of reducing block distortion according to claim 9, wherein the extraction of high-frequency components is detection of edge components of supplied image data, and the process for calculating the energy amount of the high-frequency components is an edge extracting process.

14. A block-distortion reducing apparatus for reducing block distortion caused when image data is block-encoded, said block-distortion reducing apparatus comprising:

encoding-degree-of-difficulty detecting means for detecting a parameter indicating an encoding degree of difficulty from supplied image data;

parameter calculating means for calculating a parameter required to determine block distortion from supplied image data;

block distortion determining means for determining block distortion in accordance with a result of detection of the parameter indicating the encoding degree of difficulty and a result of the calculation for obtaining the parameter;

correction-value calculating means for calculating a correction value for reducing block distortion; and means for subjecting supplied image data to a correction using a correction value corresponding to a result of the determination of block distortion so as to produce an output.

15. A block-distortion reducing apparatus according to claim 14, further comprising switching and selection means for performing switching between the corrected signal and supplied image data in accordance with a result of the determination communicated from said block-distortion determining means.

16. A block-distortion reducing apparatus according to claim 14, wherein said encoding-degree-of-difficulty detection means performs a process for calculating an amount of energy of high-frequency components in such a way that high-frequency components of supplied image data are extracted so as to detect the parameter indicating the encoding degree of difficulty.

17. A block-distortion reducing apparatus according to claim 14, wherein encoding-degree-of-difficulty detection means performs a motion detection process to detect the motion of supplied image data so as to detect the parameter indicating the encoding degree of difficulty.

18. A block-distortion reducing apparatus according to claim 14, wherein said encoding-degree-of-difficulty detection means performs a motion detection process to detect the motion of supplied image data and a process for calculating an amount of energy of high-frequency components in such a way that high-frequency components of supplied image data are extracted so as to detect the parameter indicating the encoding degree of difficulty.

19. A block-distortion reducing apparatus according to claim 14, further comprising decoding means for subjecting a supplied bit stream to a decoding process for the purpose of obtaining supplied image data, wherein said decoding means subjects supplied image data to the decoding process and detects a motion vector difference signal and an IDCT coefficient contained in supplied image data;

said encoding-degree-of-difficulty detection means converts the motion vector difference signal and the IDCT coefficient into a parameter indicating the encoding degree of difficulty.

20. A block-distortion reducing apparatus according to claim 14, further comprising correlation detecting means for detecting correlation of a boundary among blocks, wherein said block-distortion determining means uses the correlation detected by said correlation detecting means to determine block distortion, and said correction-value calculating means use the correlation detected by said correlation detecting means to calculate the correction value.

21. A block-distortion reducing apparatus according to claim 16, wherein the high-frequency components are edge components of supplied image data, and the process for calculating the energy amount of the high-frequency components is an edge extracting process.

22. A block-distortion reducing apparatus according to claim 16, wherein said correction-value calculating means uses a parameter on the basis of a result of the extraction of the high-frequency components in said process for calculating the energy amount of the high-frequency components to calculate the correction value.

23. A block-distortion reducing apparatus according to claim 17, wherein said correction-value calculating means uses the parameter on the basis of the motion detection performed in the motion detecting process to calculate the correction value.

24. A block-distortion reducing apparatus according to claim 18, wherein said correction-value calculating means uses the parameter on the basis of a result of the extraction of the high-frequency components in the process for calculating the energy amount of the high-frequency components and a result of the motion detection performed in said motion detecting process.

25. A block-distortion reducing apparatus according to claim 19, wherein said block-distortion determining means uses the parameter on the basis of the motion vector difference signal and the IDCT coefficient detected by said decoding means to determine block distortion, and said correction-value calculating means uses the parameter on the basis of the motion vector signal and the IDCT coefficient detected by said decoding means to calculate the correction value.

26. An encoding method comprising:

a block-distortion reducing step for reducing block distortion caused from block encoding/decoding of image data, and including a decoding step for decoding a supplied bit stream into image data; and an encoding step for encoding image data obtained in said block-distortion reducing step into a bit stream, wherein the supplied bit stream has been encoded by using block encoding and motion compensation, said decoding step is performed such that a motion vector of the motion compensation is extracted from the supplied bit stream, and said block-distortion reducing step is performed such that the motion vector obtained in said decoding step is used to perform adaptive block-distortion reduction.

27. An encoding method according to claim 26, wherein the supplied bit stream is in the form conforming to MPEG (Moving Pictures Experts Group) standard.

28. An encoding apparatus comprising:

block-distortion reducing means for reducing block distortion caused from block encoding/decoding of image data, including decoding means for decoding a supplied bit stream into image data; and encoding means for encoding image data obtained by said block-distortion reducing means into a bit stream, wherein the supplied bit stream has been encoded by using block encoding and motion compensation, said decoding means extracts the motion vector of the motion compensation from the supplied bit stream, and said block-distortion reducing means uses the motion vector obtained by said decoding means to perform adaptive block-distortion reduction.

29. An encoding apparatus according to claim 28, wherein the supplied bit stream is in the form conforming to MPEG (Moving Pictures Experts Group) standard.

* * * * *